United States Patent
Rudnick et al.

(10) Patent No.: US 12,078,868 B2
(45) Date of Patent: Sep. 3, 2024

(54) FOLDED CAMERA LENS DESIGNS

(71) Applicant: Corephotonics Ltd., Tel Aviv (IL)

(72) Inventors: Roy Rudnick, Tel Aviv (IL); Michael Dror, Nes Ziona (IL); Ephraim Goldenberg, Ashdod (IL); Gal Shabtay, Tel Aviv (IL); Gil Bachar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 337 days.

(21) Appl. No.: 16/604,009

(22) PCT Filed: May 4, 2019

(86) PCT No.: PCT/IB2019/053662
§ 371 (c)(1),
(2) Date: Oct. 9, 2019

(87) PCT Pub. No.: WO2019/220255
PCT Pub. Date: Nov. 21, 2019

(65) Prior Publication Data
US 2021/0333692 A1    Oct. 28, 2021

Related U.S. Application Data

(60) Provisional application No. 62/755,726, filed on Nov. 5, 2018, provisional application No. 62/671,086, filed on May 14, 2018.

(51) Int. Cl.
    *G02B 9/60*    (2006.01)
    *G02B 7/02*    (2021.01)
    (Continued)

(52) U.S. Cl.
    CPC ............... *G02B 9/60* (2013.01); *G02B 7/021* (2013.01); *G02B 13/0045* (2013.01);
    (Continued)

(58) Field of Classification Search
    CPC ... G02B 9/58; G02B 9/60; G02B 9/62; G02B 9/64; G02B 13/004; G02B 13/0045; G02B 13/005; G02B 13/0055
    See application file for complete search history.

(56) References Cited

U.S. PATENT DOCUMENTS

| 2,106,752 A | 2/1938 | Land |
| 2,354,503 A | 7/1944 | Arthur |

(Continued)

FOREIGN PATENT DOCUMENTS

| CN | 102147519 A | 8/2011 |
| CN | 102193162 A | 9/2011 |

(Continued)

OTHER PUBLICATIONS

"Cheat sheet: how to understand f-stops", Internet article, Digital Camera World, 2017.
(Continued)

*Primary Examiner* — Ephrem Z Mebrahtu
(74) *Attorney, Agent, or Firm* — Nathan & Associates; Menachem Nathan

(57) ABSTRACT

Folded lens modules and assemblies characterized by low height and large entrance pupil (clear aperture), designed for folded cameras in consumer electronics and specifically in mobile phones. In some embodiments, a folded lens assembly comprises a plurality of lens elements that include, in order for an object side to an image side, a first lens element $L_1$ with a clear aperture $CA(S_1)$ and a second lens element $L_2$ with a clear aperture $CA(S_3)$, wherein $CA(S_1)/CA(S_3) >1.2$ and wherein the lens assembly has a ratio between an image sensor diagonal length SDL and a clear aperture of a last lens element surface $CA(S_{2N})$, $SDL/CA(S_{2N})>1.5$.

3 Claims, 16 Drawing Sheets

(51) Int. Cl.
*G02B 13/00* (2006.01)
*G03B 17/04* (2021.01)
*G03B 17/12* (2021.01)
*H04N 23/55* (2023.01)

(52) U.S. Cl.
CPC ............ *G03B 17/04* (2013.01); *G03B 17/12* (2013.01); *H04N 23/55* (2023.01)

(56) References Cited

U.S. PATENT DOCUMENTS

| | | | |
|---|---|---|---|
| 2,378,170 | A | 6/1945 | Aklin |
| 2,441,093 | A | 5/1948 | Aklin |
| 3,388,956 | A | 6/1968 | Eggert et al. |
| 3,524,700 | A | 8/1970 | Eggert et al. |
| 3,558,218 | A | 1/1971 | Grey |
| 3,864,027 | A | 2/1975 | Harada |
| 3,942,876 | A | 3/1976 | Betensky |
| 4,134,645 | A | 1/1979 | Sugiyama et al. |
| 4,338,001 | A | 7/1982 | Matsui |
| 4,465,345 | A | 8/1984 | Yazawa |
| 5,000,551 | A | 3/1991 | Shibayama |
| 5,969,869 | A | 10/1999 | Hirai et al. |
| 6,147,702 | A | 11/2000 | Smith |
| 6,169,636 | B1 | 1/2001 | Kreitzer |
| 6,654,180 | B2 | 11/2003 | Ori |
| 7,187,504 | B2 | 3/2007 | Horiuchi |
| 7,206,136 | B2 | 4/2007 | Abaziewicz et al. |
| 7,515,351 | B2 | 4/2009 | Chen et al. |
| 7,564,635 | B1 | 7/2009 | Tang |
| 7,643,225 | B1 | 1/2010 | Tsai |
| 7,660,049 | B2 | 2/2010 | Tang |
| 7,684,128 | B2 | 3/2010 | Tang |
| 7,688,523 | B2 | 3/2010 | Sano |
| 7,692,877 | B2 | 4/2010 | Tang et al. |
| 7,697,220 | B2 | 4/2010 | Iyama |
| 7,738,186 | B2 | 6/2010 | Chen et al. |
| 7,777,972 | B1 | 8/2010 | Chen et al. |
| 7,813,057 | B2 | 10/2010 | Lin |
| 7,821,724 | B2 | 10/2010 | Tang et al. |
| 7,826,149 | B2 | 11/2010 | Tang et al. |
| 7,826,151 | B2 | 11/2010 | Tsai |
| 7,869,142 | B2 | 1/2011 | Chen et al. |
| 7,898,747 | B2 | 3/2011 | Tang |
| 7,916,401 | B2 | 3/2011 | Chen et al. |
| 7,918,398 | B2 | 4/2011 | Li et al. |
| 7,957,075 | B2 | 6/2011 | Tang |
| 7,957,076 | B2 | 6/2011 | Tang |
| 7,957,079 | B2 | 6/2011 | Tang |
| 7,961,406 | B2 | 6/2011 | Tang et al. |
| 8,000,031 | B1 | 8/2011 | Tsai |
| 8,004,777 | B2 | 8/2011 | Souma |
| 8,077,400 | B2 | 12/2011 | Tang |
| 8,149,523 | B2 | 4/2012 | Ozaki |
| 8,218,253 | B2 | 7/2012 | Tang |
| 8,228,622 | B2 | 7/2012 | Tang |
| 8,233,224 | B2 | 7/2012 | Chen |
| 8,253,843 | B2 | 8/2012 | Lin |
| 8,279,537 | B2 | 10/2012 | Sato |
| 8,363,337 | B2 | 1/2013 | Tang et al. |
| 8,395,851 | B2 | 3/2013 | Tang et al. |
| 8,400,717 | B2 | 3/2013 | Chen et al. |
| 8,451,549 | B2 | 5/2013 | Yamanaka et al. |
| 8,503,107 | B2 | 8/2013 | Chen et al. |
| 8,514,502 | B2 | 8/2013 | Chen |
| 8,570,668 | B2 | 10/2013 | Takakubo et al. |
| 8,718,458 | B2 | 5/2014 | Okuda |
| 8,780,465 | B2 | 7/2014 | Chae |
| 8,810,923 | B2 | 8/2014 | Shinohara |
| 8,854,745 | B1 | 10/2014 | Chen |
| 8,958,164 | B2 | 2/2015 | Kwon et al. |
| 9,185,291 | B1 | 11/2015 | Shabtay |
| 9,229,194 | B2 | 1/2016 | Yoneyama et al. |
| 9,235,036 | B2 | 1/2016 | Kato et al. |
| 9,279,957 | B2 | 3/2016 | Kanda et al. |
| 9,438,792 | B2 | 9/2016 | Nakada et al. |
| 9,488,802 | B2 | 11/2016 | Chen et al. |
| 9,568,712 | B2 | 2/2017 | Dror et al. |
| 9,678,310 | B2 | 6/2017 | Iwasaki et al. |
| 9,817,213 | B2 | 11/2017 | Mercado |
| 2002/0118471 | A1 | 8/2002 | Imoto |
| 2005/0041300 | A1 | 2/2005 | Oshima et al. |
| 2005/0062346 | A1 | 3/2005 | Sasaki |
| 2005/0128604 | A1 | 6/2005 | Kuba |
| 2005/0141103 | A1 | 6/2005 | Nishina |
| 2005/0168840 | A1 | 8/2005 | Kobayashi et al. |
| 2005/0270667 | A1 | 12/2005 | Gurevich et al. |
| 2007/0229983 | A1 | 10/2007 | Saori |
| 2008/0056698 | A1 | 3/2008 | Lee et al. |
| 2008/0304161 | A1 | 12/2008 | Souma |
| 2009/0002839 | A1 | 1/2009 | Sato |
| 2009/0122423 | A1 | 5/2009 | Park et al. |
| 2009/0141365 | A1 | 6/2009 | Jannard et al. |
| 2009/0225438 | A1 | 9/2009 | Kubota |
| 2010/0165476 | A1 | 7/2010 | Eguchi |
| 2010/0277813 | A1 | 11/2010 | Ito |
| 2011/0001838 | A1 | 1/2011 | Lee |
| 2011/0080655 | A1 | 4/2011 | Mori |
| 2011/0115965 | A1 | 5/2011 | Engelhardt et al. |
| 2011/0149119 | A1 | 6/2011 | Matsui |
| 2011/0157430 | A1 | 6/2011 | Hosoya et al. |
| 2011/0188121 | A1 | 8/2011 | Goring et al. |
| 2012/0069455 | A1 | 3/2012 | Lin |
| 2012/0092777 | A1 | 4/2012 | Tochigi et al. |
| 2012/0105708 | A1 | 5/2012 | Hagiwara |
| 2012/0154929 | A1 | 6/2012 | Tsai et al. |
| 2012/0229920 | A1 | 9/2012 | Otsu et al. |
| 2012/0262806 | A1 | 10/2012 | Lin et al. |
| 2013/0016261 | A1* | 1/2013 | Tanaka ............... G02B 13/0045 359/708 |
| 2013/0057971 | A1 | 3/2013 | Zhao et al. |
| 2013/0088788 | A1 | 4/2013 | You |
| 2013/0208178 | A1 | 8/2013 | Park |
| 2013/0279032 | A1 | 10/2013 | Suigetsu et al. |
| 2013/0286488 | A1 | 10/2013 | Chae |
| 2014/0022436 | A1 | 1/2014 | Kim et al. |
| 2014/0146216 | A1 | 5/2014 | Okumura |
| 2014/0204480 | A1 | 7/2014 | Jo et al. |
| 2014/0240853 | A1 | 8/2014 | Kubota et al. |
| 2014/0285907 | A1 | 9/2014 | Tang et al. |
| 2014/0293453 | A1 | 10/2014 | Ogino et al. |
| 2014/0362274 | A1 | 12/2014 | Christie et al. |
| 2015/0116569 | A1 | 4/2015 | Mercado |
| 2015/0253543 | A1 | 9/2015 | Mercado |
| 2015/0253647 | A1 | 9/2015 | Mercado |
| 2015/0373252 | A1 | 12/2015 | Georgiev |
| 2015/0373263 | A1 | 12/2015 | Georgiev et al. |
| 2016/0044250 | A1* | 2/2016 | Shabtay ............... H04N 23/55 348/240.3 |
| 2016/0062084 | A1 | 3/2016 | Chen et al. |
| 2016/0070088 | A1 | 3/2016 | Koguchi |
| 2016/0085089 | A1 | 3/2016 | Mercado |
| 2016/0187631 | A1 | 6/2016 | Choi et al. |
| 2016/0291295 | A1 | 10/2016 | Shabtay |
| 2016/0306161 | A1 | 10/2016 | Harada et al. |
| 2016/0313537 | A1 | 10/2016 | Mercado |
| 2016/0341931 | A1 | 11/2016 | Liu et al. |
| 2016/0353008 | A1 | 12/2016 | Osborne |
| 2017/0023778 | A1 | 1/2017 | Inoue |
| 2017/0068070 | A1* | 3/2017 | Tang .................. G02B 13/0045 |
| 2017/0102522 | A1 | 4/2017 | Jo |
| 2017/0115471 | A1 | 4/2017 | Shinohara |
| 2017/0160511 | A1 | 6/2017 | Kim et al. |
| 2018/0024319 | A1* | 1/2018 | Lai ...................... G02B 13/004 359/739 |
| 2018/0059365 | A1 | 3/2018 | Bone et al. |
| 2018/0059376 | A1 | 3/2018 | Lin et al. |
| 2018/0081149 | A1 | 3/2018 | Bae et al. |
| 2018/0188491 | A1* | 7/2018 | Chang ............... G02B 13/0045 |
| 2018/0188504 | A1* | 7/2018 | Chang ............... G02B 13/06 |
| 2018/0217475 | A1 | 8/2018 | Goldenberg et al. |
| 2018/0224630 | A1 | 8/2018 | Lee et al. |
| 2018/0275371 | A1* | 9/2018 | Jhang ................. G02B 9/60 |
| 2019/0086638 | A1* | 3/2019 | Lee ..................... H04N 23/687 |

(56) References Cited

U.S. PATENT DOCUMENTS

| | | | |
|---|---|---|---|
| 2019/0094500 A1 | 3/2019 | Tseng et al. | |
| 2019/0170965 A1 | 6/2019 | Shabtay | |
| 2019/0219796 A1* | 7/2019 | Chen | G02B 3/04 |
| 2019/0339491 A1* | 11/2019 | Chang | G02B 13/0045 |
| 2021/0063687 A1* | 3/2021 | Huh | G02B 9/60 |

FOREIGN PATENT DOCUMENTS

| | | | |
|---|---|---|---|
| CN | 102147519 B | 1/2013 | |
| CN | 104297906 A | 1/2015 | |
| CN | 105467563 A | 4/2016 | |
| JP | 854157620 A | 12/1979 | |
| JP | 859121015 A | 7/1984 | |
| JP | 6165212 A | 4/1986 | |
| JP | 86370211 A | 3/1988 | |
| JP | 406059195 A | 3/1994 | |
| JP | 07333505 A | 12/1995 | |
| JP | 2007133096 A | 5/2007 | |
| JP | 2007219199 A | 8/2007 | |
| JP | 2007306282 A | 11/2007 | |
| JP | 2010032936 A | 2/2010 | |
| JP | 2010164841 A | 7/2010 | |
| JP | 2011145315 A | 7/2011 | |
| JP | 2011151448 A | 8/2011 | |
| JP | 2012203234 A | 10/2012 | |
| JP | 2013105049 A | 5/2013 | |
| JP | 2013106289 A | 5/2013 | |
| JP | 2014142542 A | 8/2014 | |
| KR | 20140135909 A | 5/2013 | |
| KR | 20140023552 A | 2/2014 | |
| WO | 2013058111 A1 | 4/2013 | |
| WO | 2013063097 A1 | 5/2013 | |

OTHER PUBLICATIONS

Office action in related TW patent application 108140139, dated Jul. 7, 2020. 3 pages.
Office Action in related CN patent application 201980002019.0, dated Mar. 16, 2021. 8 pages.
Office Action in related JP patent application 2019-566286, dated Jan. 6, 2021. 3 pages.
Office Action in related KR patent application 2019-7030597, dated Jan. 19, 2021. 4 pages.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
International Search Report and Written Opinion in related PCT application PCT/IB2019/053662, dated Sep. 16, 2019. 7 pages.
Office Action in related KR patent application 2023-7002315, dated Sep. 19, 2023.
Office Action in related TW patent application 112101452, dated Dec. 1, 2023.

* cited by examiner

FOLDED CAMERA LENS DESIGNS

CROSS REFERENCE TO RELATED APPLICATIONS

This application is a 371 National Phase application from international application PCT/IB2019/053662 filed May 4, 2019 and claims the benefit of priority from U.S. Provisional patent applications No. 62/671,086 filed May 14, 2018 and 62/755,826 filed Nov. 5, 2018, both of which are incorporated herein by reference in their entirety.

TECHNICAL FIELD

The presently disclosed subject matter is generally related to the field of digital cameras.

BACKGROUND

Dual-aperture zoom cameras (also referred to as dual-cameras), in which one camera (also referred to as "sub-camera") has a Wide FOV ("Wide sub-camera") and the other has a narrow FOV ("Tele sub-camera"), are known.

International patent publication WO 2016/024192, which is incorporated herein by reference in its entirety, discloses a "folded camera module" (also referred to simply as "folded camera") that reduces the height of a compact camera. In the folded camera, an optical path folding element (referred to hereinafter as "OPFE") e.g. a prism or a mirror (otherwise referred to herein collectively as "reflecting element") is added in order to tilt the light propagation direction from perpendicular to the smart-phone back surface to parallel to the smart-phone back surface. If the folded camera is part of a dual-aperture camera, this provides a folded optical path through one lens assembly (e.g. a Tele lens). Such a camera is referred to herein as "folded-lens dual-aperture camera". In general, the folded camera may be included in a multi-aperture camera, for example together with two "non-folded" (upright) camera modules in a triple-aperture camera.

SUMMARY

A small height of a folded camera is important to allow a host device (e.g. a smartphone, tablets, laptops or smart TV) that includes it to be as thin as possible. The height of the camera is often limited by the industrial design. In contrast, increasing the optical aperture of the lens results in an increase in the amount of light arriving at the image sensor and improves the optical properties of the camera.

Therefore, there is a need for, and it would be advantageous to have a folded camera in which the height of the lens optical aperture is maximal for a given camera height and/or for a lens module height.

In exemplary embodiments, there are provided high optical performance lenses (or "lens assemblies") with a large front clear aperture (CA), a large first surface CA and relatively small clear apertures for all other lens elements. The lens elements are listed in order from an object side (first lens element $L_1$) to an image side (last lens element $L_i$). In each embodiment, the last lens element clear aperture is smaller than the diagonal length of an image sensor (also referred to herein as "sensor diagonal length" or "SDL") included with the lens in a digital camera. In the following Tables, all dimensions are given in millimeters. All terms and acronyms have their ordinary meaning as known in the art.

In some embodiments, there are provided folded lens assemblies for a folded camera, comprising: a plurality of lens elements that include, in order for an object side to an image side, a first lens element $L_1$ with a clear aperture $CA(S_1)$ and a second lens element $L_2$ with a clear aperture $CA(S_3)$, wherein $CA(S_1)/CA(S_3) > 1.2$ and wherein the lens assembly has a ratio between an image sensor diagonal length SDL and a clear aperture of a last lens element surface $CA(S_{2N})$, $SDL/CA(S_{2N}) > 1.5$.

In some embodiments, the first lens element has positive refractive power and the second lens element has negative refractive power, and the plurality of lens elements further includes a third lens element with positive refractive power and a fourth lens element with negative refractive power.

In some embodiments, the first lens element has positive refractive power and the second lens element has negative refractive power, and the plurality of lens elements further includes a third lens element with positive refractive power and a fourth lens element with positive refractive power.

In some embodiments, the first lens element has positive refractive power and the second lens element has negative refractive power, and the plurality of lens elements further includes a third lens element with negative refractive power and a fourth lens element with positive refractive power.

In some embodiments, the plurality of lens elements further includes a fifth lens element with negative refractive power.

In some embodiments, the lens assembly has a total track length (TTL) and a back focal length (BFL) with a ratio $BFL/TTL > 0.35$.

In some embodiments, an optical window is positioned in a path defining the BFL and the TTL.

In some embodiments, there are provided folded lens assemblies for a folded camera, comprising: a plurality N of lens elements that include, in order for an object side to an image side, a first lens element $L_1$ with a clear aperture $CA(S_1)$, wherein all clear apertures of all other lens elements $L_2$ to $L_N$ of the plurality N of lens elements are no larger than $CA(S_1)$, wherein the folded camera includes an image sensor having a sensor diagonal length SDL and wherein $CA(S_1) < SDL < 1.5 \times CA(S_1)$.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale. In the drawings.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), an application specific integrated circuit (ASIC), etc.) capable of executing various data processing operations.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Figure 1A:
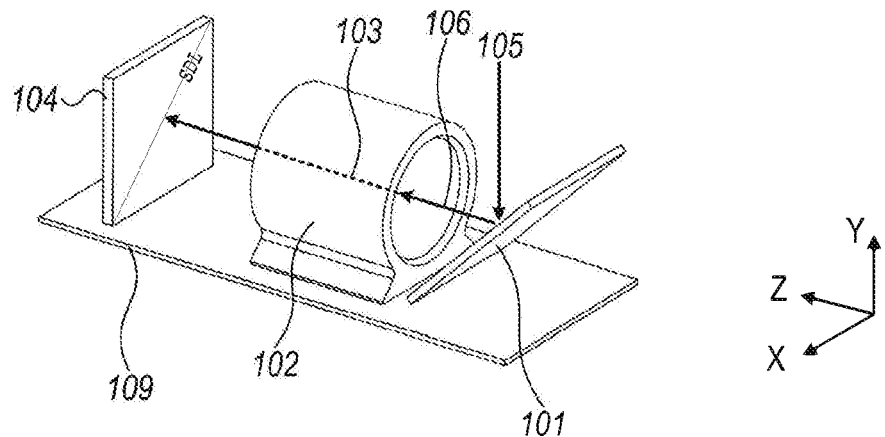
FIG. 1A is a general isometric view of an example of a known folded camera.
Figure 1B:
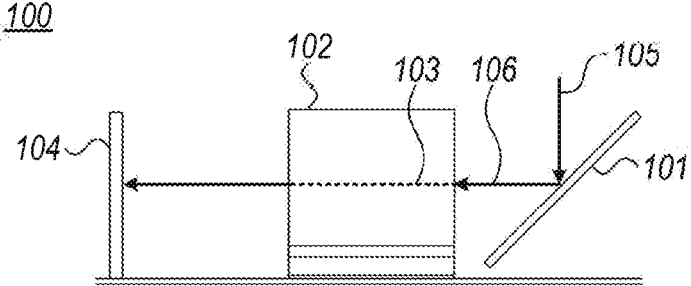
FIG. 1B is a side view of the camera of FIG. 1A.
Figure 1C:
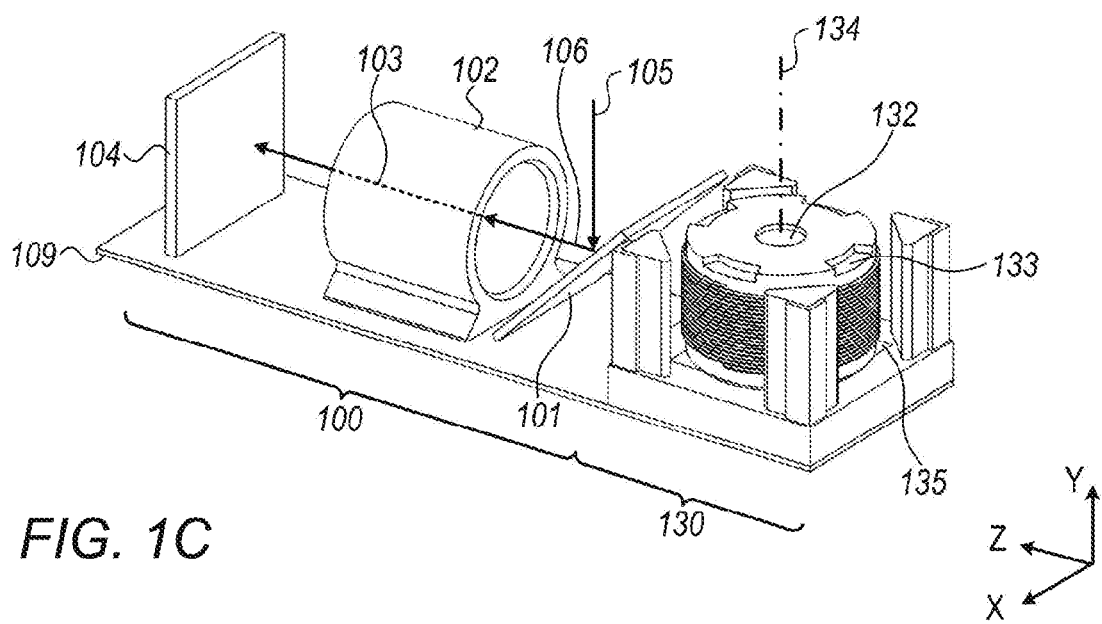
FIG. 1C is a general isometric view of an example of a known camera comprising a folded Tele sub-camera and a Wide sub-camera.
Figure 1D:
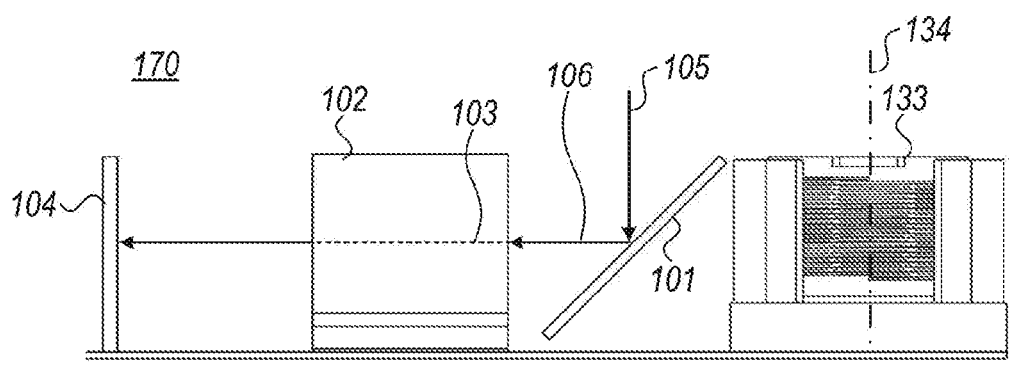
FIG. 1D is a side view of the camera of FIG. 1C.

FIGS. 1A and 1B illustrate a digital folded camera 100, which may operate for example as a Tele camera. Digital camera 100 comprises a first reflecting element (e.g. mirror or prism, and also referred to sometimes as "optical path folding element" (OPFE)) 101, a plurality of lens elements (not visible in this representation, but visible e.g. in FIGS. 2A and 2B) and an image sensor 104. The lens elements (and also barrel, the optical lens module) may have axial symmetric along a first optical axis 103. At least some of the lens elements can be held by a structure called a "barrel" 102. An optical lens module comprises the lens elements and the barrel. The barrel can have a longitudinal symmetry along optical axis 103. In FIGS. 1A to 1D, the cross-section of this barrel is circular. This is, however, not mandatory and other shapes can be used.

The path of the optical rays from an object (not shown) to image sensor 104 defines an optical path (see optical paths 105 and 106, which represent portions of the optical path).

OPFE 101 may be a prism or a mirror. As shown in FIG. 1A, OPFE 101 can be a mirror inclined with respect to optical axis 103. In other cases (not shown, see for example PCT/IB2017/052383), OPFE 101 can be a prism with a back surface inclined with respect to optical axis 103. OPFE folds the optical path from a first optical path 105 to a second optical path 106. Optical path 106 is substantially parallel to the optical axis 103. The optical path is thus referred to as "folded optical path" (indicated by optical paths 105 and 106) and camera 100 is referred to as "folded camera".

In particular, in some examples, OPFE 101 can be inclined at substantially 45° with respect to optical axis 103. In FIG. 1A, OPFE 101 is also inclined at substantially 45° with respect to optical path 105.

In some known examples, image sensor 104 lies in a X-Y plane substantially perpendicular to optical axis 103. This is however not limiting and the image sensor 104 can have a different orientation. For example, and as described in WO 2016/024192, image sensor 104 can be in the XZ plane. In this case, an additional OPFE can be used to reflect the optical rays towards image sensor 104.

According to some examples, image sensor 104 has a rectangular shape. According to some examples, image sensor 104 has a circular shape. These examples are however not limiting.

In various examples camera 100 may be mounted on a substrate 109, e.g. a printed circuit board (PCB), as known in the art.

Two sub-cameras, for example a Wide sub-camera 130 and a Tele sub-camera 100 may be included in a digital camera 170 (also referred to as dual-camera or dual-aperture camera). A possible configuration is described with reference to FIGS. 1C and 1D. In this example, Tele sub-camera 100 is according to the camera described with reference to FIGS. 1A and 1B. The components of Tele sub-camera 100 thus have the same reference numbers as in FIGS. 1A and 1B, and are not described again.

Wide sub-camera 130 can include an aperture 132 (indicating object side of the camera) and an optical lens module 133 (or "Wide lens module") with a symmetry (and optical) axis 134 in the Y direction, as well as a Wide image sensor 135. The Wide lens module is configured to provide a Wide image. The Wide sub-camera has a Wide field of view ($FOV_W$) and the Tele sub-camera has a Tele field of view ($FOV_T$) narrower than $FOV_W$. Notably, in some examples, a plurality of Wide sub-cameras and/or a plurality of Tele sub-cameras can be incorporated and operative in a single digital camera.

According to one example, the Wide image sensor 135 lies in the X-Z plane, while image sensor 104 (which is in this example is a Tele image sensor) lies in a X-Y plane substantially perpendicular to optical axis 103.

In the examples of FIGS. 1A to 1D, camera 100 can further include (or be otherwise operatively connected to) a processing device comprising one or more suitably configured processors (not shown) for performing various processing operations, for example processing the Tele image and the Wide image into a fused output image.

The processing unit may include hardware (HW) and software (SW) specifically dedicated for operating with the digital camera. Alternatively, a processor of an electronic device (e.g. its native CPU) in which the camera is installed can be adapted for executing various processing operations related to the digital camera (including, but not limited to, processing the Tele image and the Wide image into an output image).

Figure 2A:
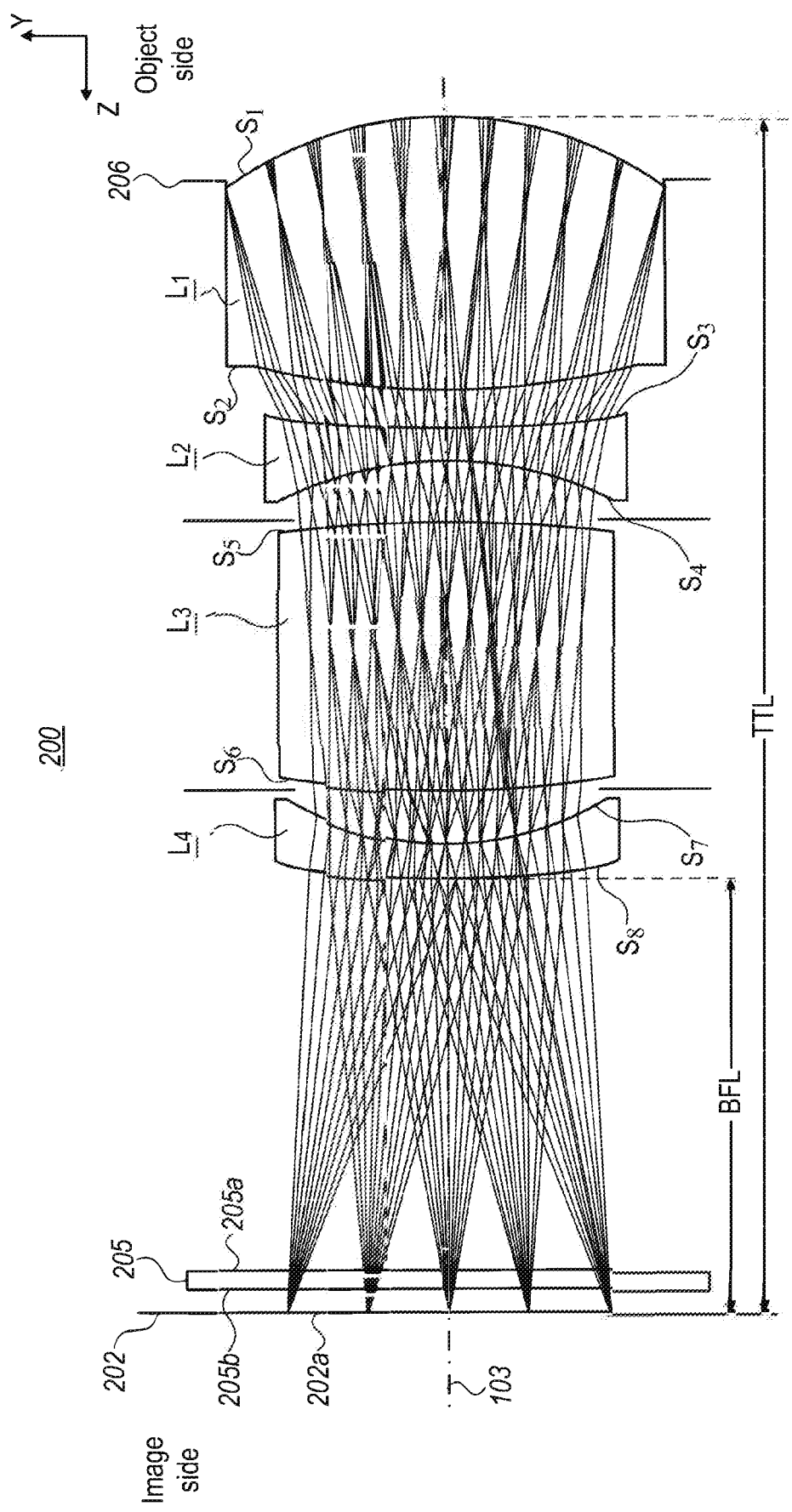
FIG. 2A is a schematic view of one embodiment of lens elements with light rays according to some examples of the presently disclosed subject matter.
Figure 2B:
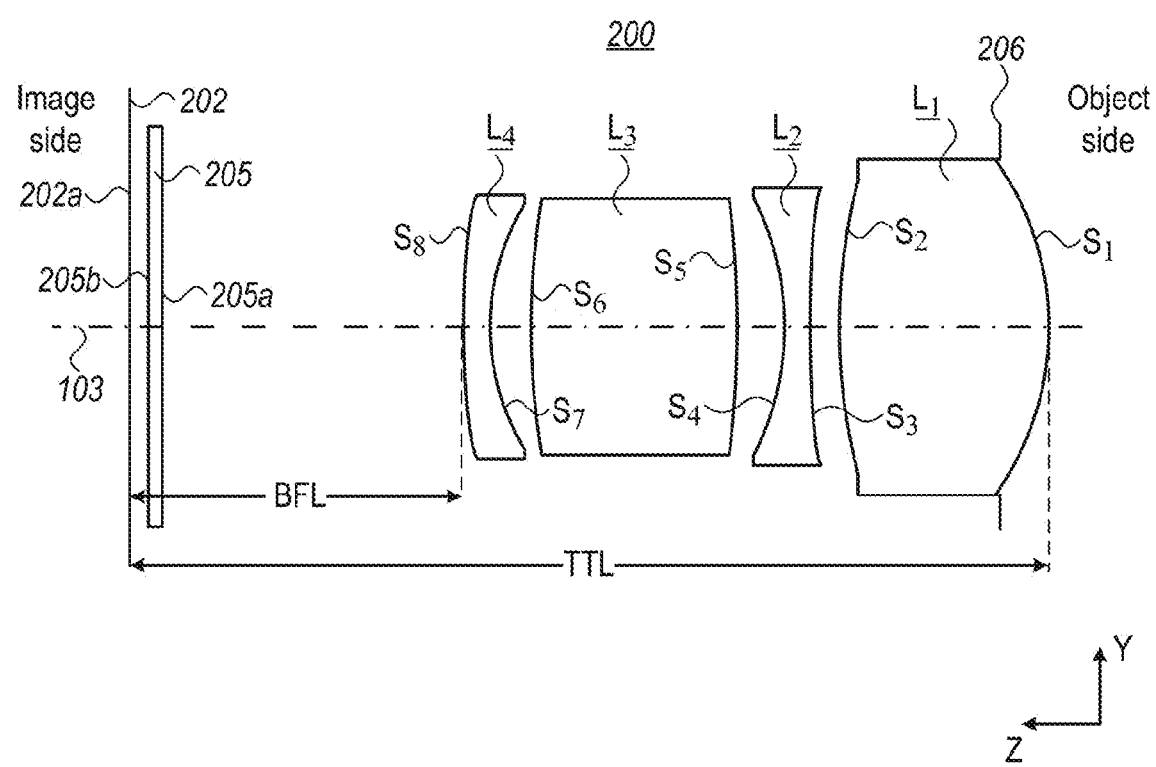
FIG. 2B is another schematic view of the lens elements of FIG. 2A.

Attention is now drawn to FIGS. 2A and 2B, which show schematic view of a lens module 200 having lens elements shown with optical rays according to some examples of the presently disclosed subject matter. Lens module 200 is shown without a lens barrel. FIG. 2A shows optical ray tracing of lens module 200 while FIG. 2B shows only the lens elements for more clarity. In addition, both figures show an image sensor 202 and an optical element 205.

Lens module 200 includes a plurality of N lens elements $L_i$ (wherein "i" is an integer between 1 and N). $L_1$ is the lens element closest to the object side and $L_N$ is the lens element closest to the image side, i.e. the side where the image sensor is located. This order holds for all lenses and lens elements disclosed herein. Lens elements $L_i$ can be used e.g. as lens elements of camera 100 represented in FIGS. 1A and 1B or as lens elements of the Tele sub-camera 100 of FIGS. 1C and 1D. As shown, the N lens elements are axial symmetric along optical axis 103.

In the examples of FIGS. 2A and 2B, N is equal to four. In the examples in FIGS. 6-12, N is equal to 5. This is however not limiting and a different number of lens elements can be used. For example, N can be equal to 3, 6 or 7.

In the examples of FIGS. 2A and 2B, some of the surfaces of the lens elements are represented as convex, and some are represented as concave. The representation of FIGS. 2A and 2B is however not limiting and a different combination of convex and/or concave surfaces can be used, depending on various factors such as the application, the desired optical power, etc.

Optical rays (after their reflection by a reflecting element, such as OPFE 101) pass through lens elements $L_i$ and form an image on an image sensor 202. In the examples of FIGS. 2A and 2B, the optical rays pass through an optical element 205 (which comprises a front surface 205a and a rear surface 205b, and can be e.g. a cut-off filter) also referred to as "optical window" or simply "window" before impinging on image sensor 202. This is however not limiting, and in some examples, optical element 205 is not present. Optical element 205 may be for example infra-red (IR) filter, and/or a glass image sensor dust cover.

Each lens element $L_i$ comprises a respective front surface $S_{2i-1}$ (the index "2i-1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N. The front surface and the rear surface can be in some cases aspherical. This is however not limiting.

As used herein the term "front surface" of each lens element refers to the surface of a lens element located closer to the entrance of the camera (camera object side) and the term "rear surface" refers to the surface of a lens element located closer to the image sensor (camera image side).

As explained below, a clear height value $CH(S_k)$ can be defined for each surface $S_k$ for $1 \le k \le 2N$), and a clear aperture value $CA(S_k)$ can be defined for each surface $S_k$ for $1 \le k \le 2N$). $CA(S_k)$ and $CH(S_k)$ define optical properties of each surface $S_k$ of each lens element.

Figure 3A:
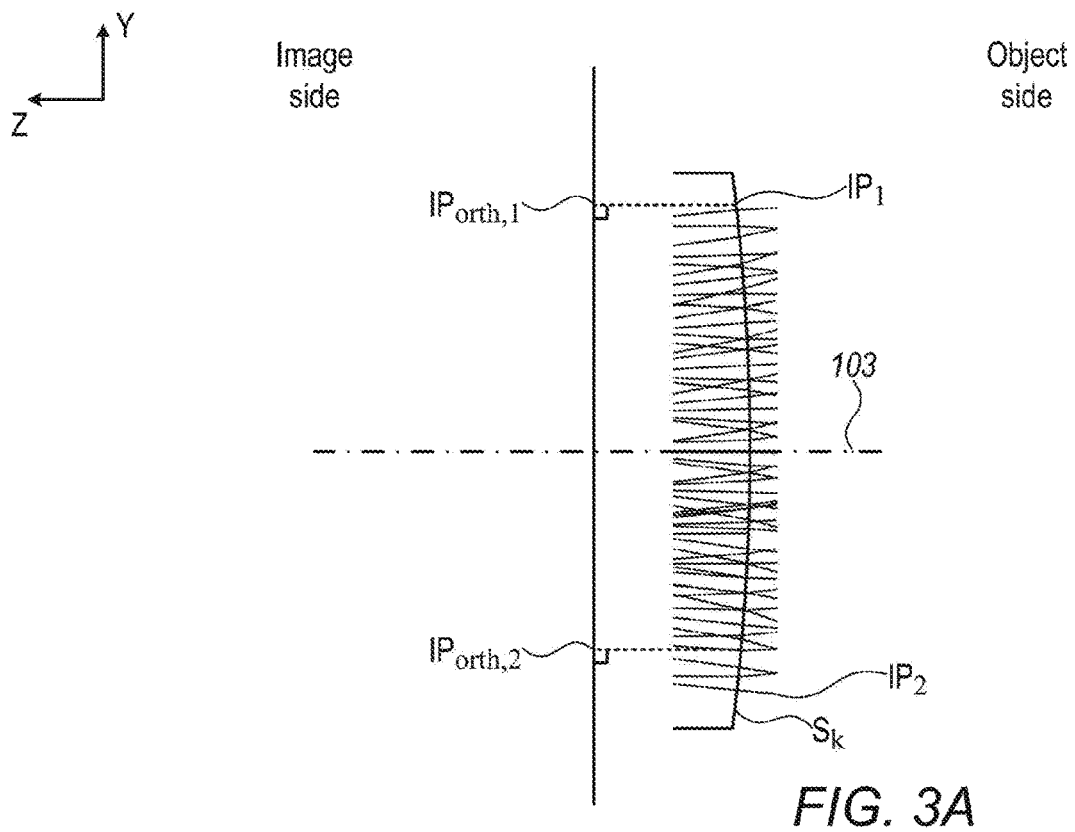
FIG. 3A is a schematic view of impact points of optical rays impinging a convex surface of a lens element, and a schematic view of the orthogonal projection of the impact points on a plane P, according to some examples of the presently disclosed subject matter.
Figure 3B:
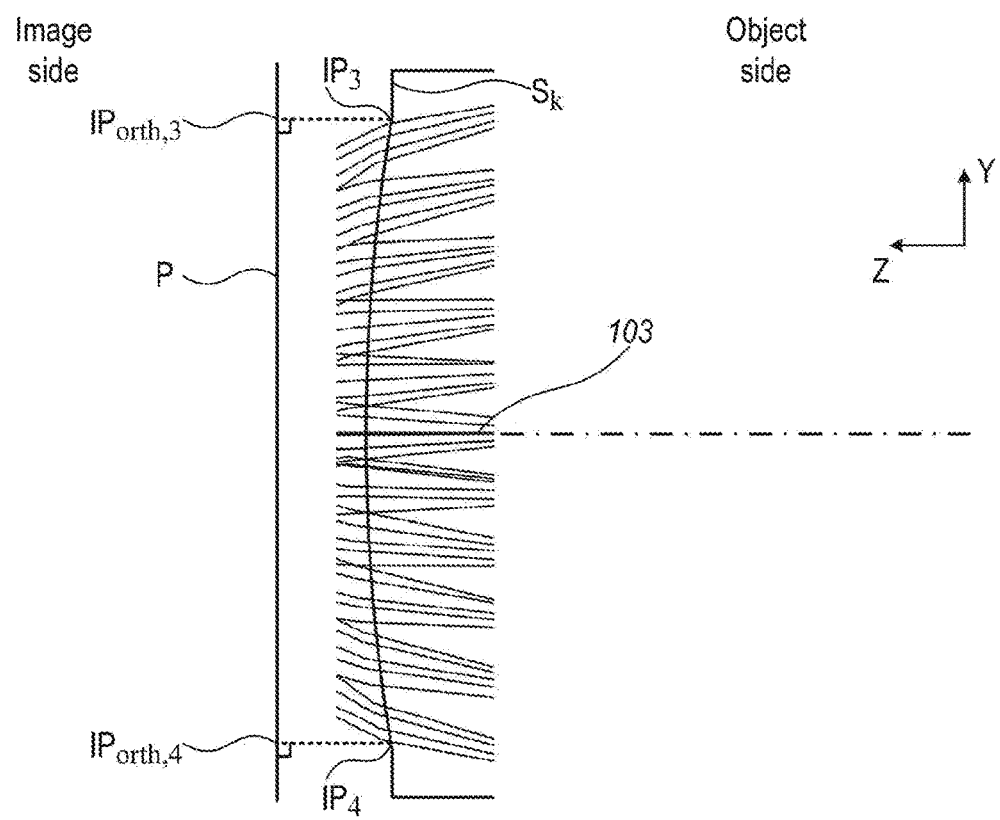
FIG. 3B is a schematic view of impact points of optical rays impinging a concave surface of a lens element, and a schematic view of the orthogonal projection of the impact points on a plane P, according to some examples of the presently disclosed subject matter.
Figure 4:
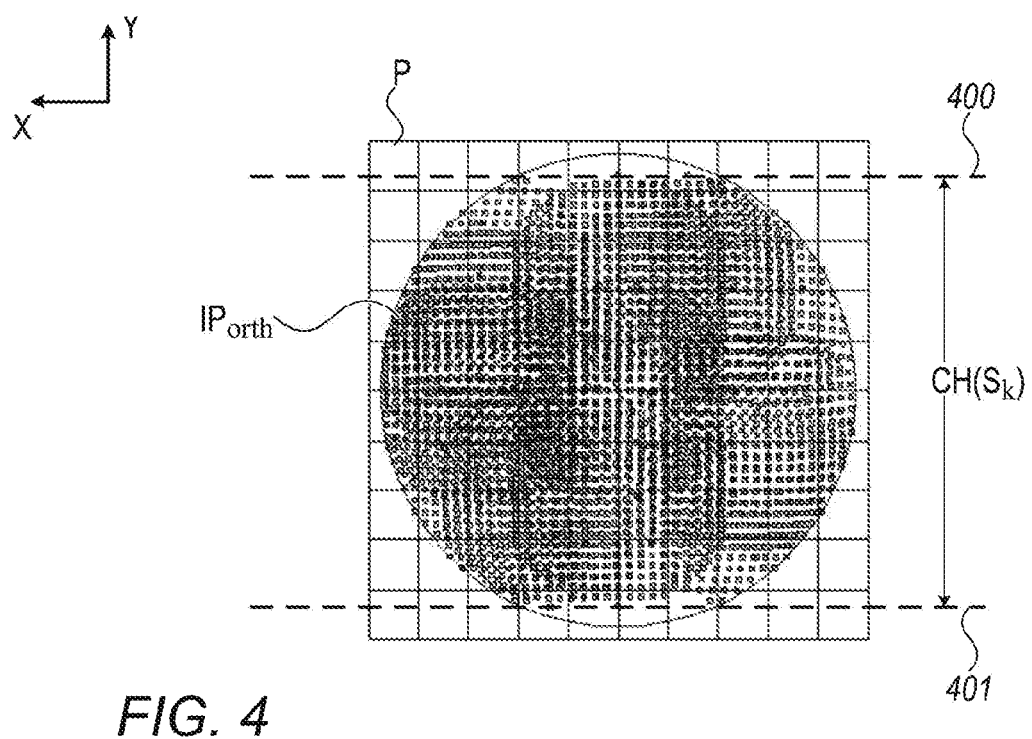
FIG. 4 is a schematic representation of the orthogonal projection of the impact points on a plane P, and of a clear height value ("CH"), according to some examples of the presently disclosed subject matter.

As shown in FIGS. 3A, 3B and 4, each optical ray that passes through a surface $S_k$ (for $1 \le k \le 2N$) impinges this surface on an impact point IP. Optical rays enter lens module 200 from surface $S_1$, and pass through surfaces $S_2$ to $S_{2N}$ consecutively. Some optical rays can impinge on any surface $S_k$ but cannot/will not reach image sensor 202. For a given surface $S_k$, only optical rays that can form an image on image sensor 202 are considered forming a plurality of impact points IP are obtained. $CH(S_k)$ is defined as the distance between two closest possible parallel lines (see lines 400 and 401 in FIG. 4 located on a plane P orthogonal to the optical axis of the lens elements (in the representation of FIGS. 3A and 3B, plane P is parallel to plane X-Y and is orthogonal to optical axis 103), such that the orthogonal projection $IP_{orth}$ of all impact points IP on plane P is located between the two parallel lines. $CH(S_k)$ can thus be defined for each surface $S_k$ (front and rear surfaces, with $1 \le k \le 2N$).

The definition of $CH(S_k)$ does not depend on the object currently imaged, since it refers to the optical rays that "can" form an image on the image sensor. Thus, even if the currently imaged object is located in a black background that does not produce light, the definition does not refer to this black background since it refers to any optical rays that "can" reach the image sensor to form an image (for example optical rays emitted by a background that would emit light, contrary to a black background).

For example, FIG. 3A illustrates the orthogonal projections $IP_{orth,1}$, $IP_{orth,2}$ of two impact points $IP_1$ and $IP_2$ on plane P which is orthogonal to optical axis 103. By way of example, in the representation of FIG. 3A, surface $S_k$ is convex.

FIG. 3B illustrates the orthogonal projections $IP_{orth,3}$, $IP_{orth,4}$ of two impact points $IP_3$ and $IP_4$ on plane P. By way of example, in the representation of FIG. 3B, surface $S_k$ is concave.

In FIG. 4, the orthogonal projection $IP_{orth}$ of all impact points IP of a surface $S_k$ on plane P is located between parallel lines 400 and 401. $CH(S_k)$ is thus the distance between lines 400 and 401.

Figure 5:
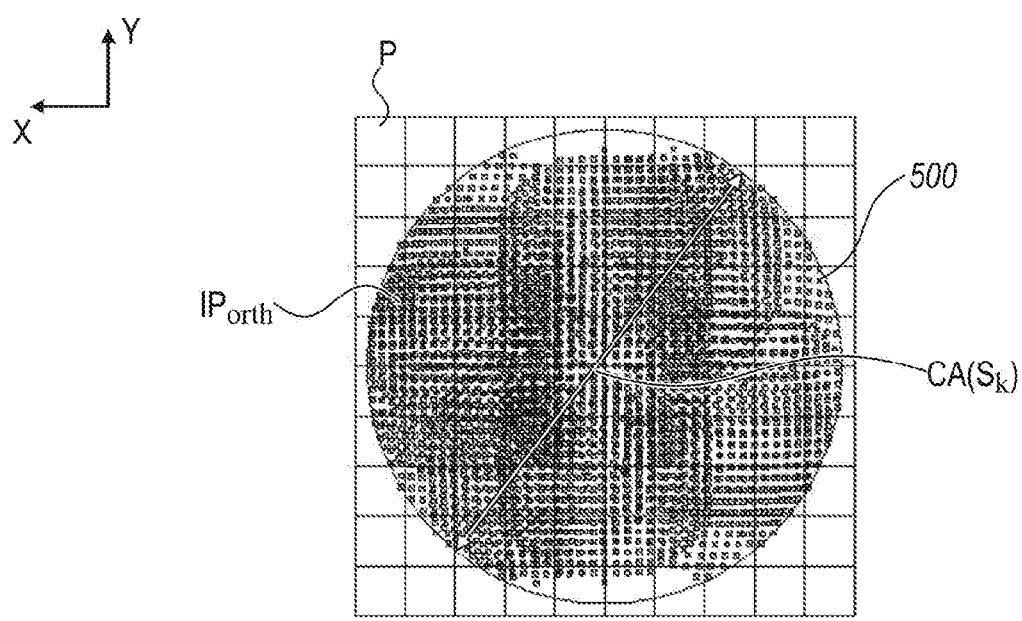
FIG. 5 is a schematic representation of the orthogonal projection of the impact points on a plane P, and of a clear aperture value ("CA"), according to some examples of the presently disclosed subject matter.
Figure 6:
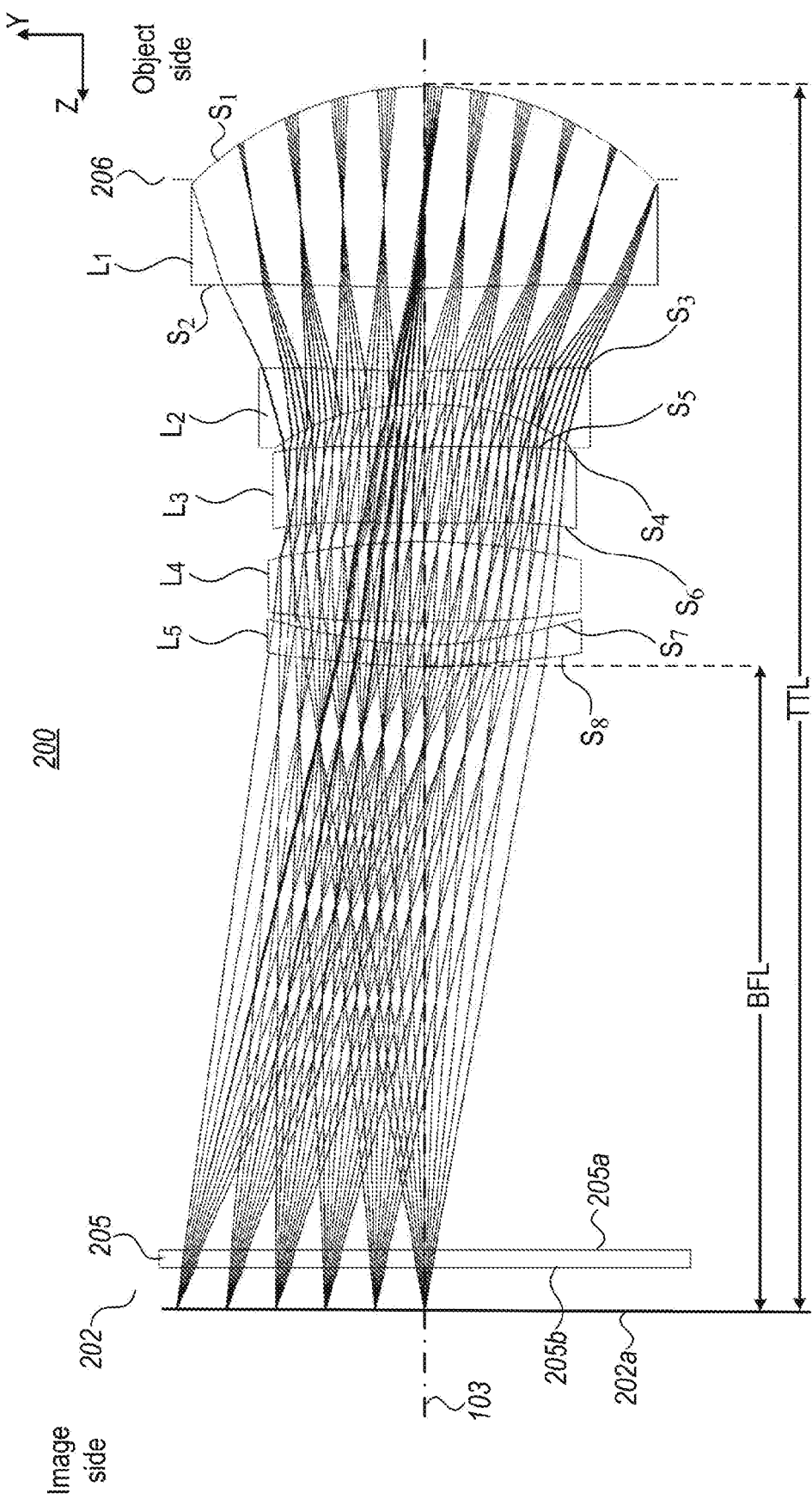
FIG. 6 is a schematic view of another embodiment of lens elements with light rays according to some examples of the presently disclosed subject matter.
Figure 7:
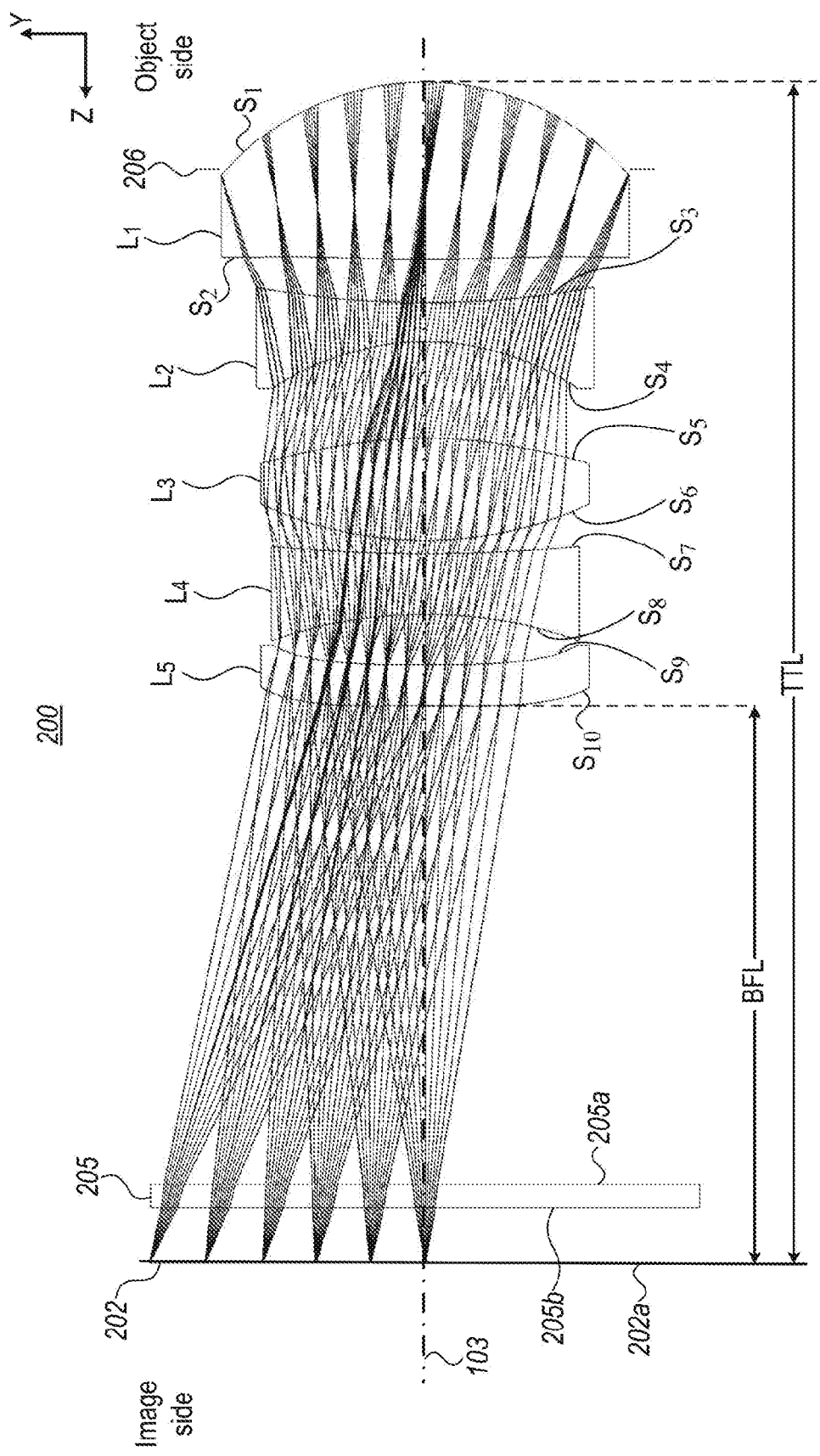
FIG. 7 is a schematic view of yet another embodiment of lens elements with light rays according to some examples of the presently disclosed subject matter.
Figure 8:
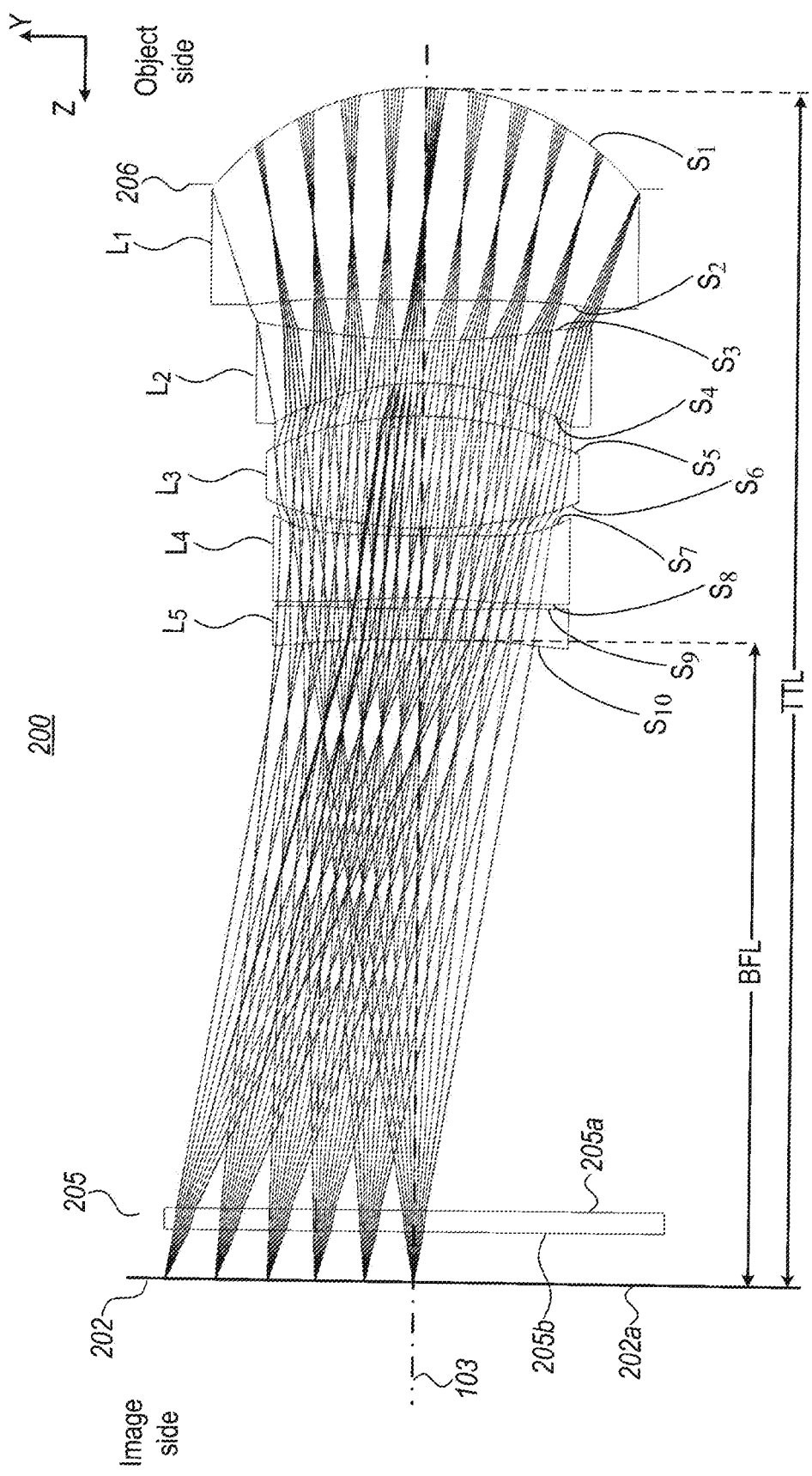
FIG. 8 is a schematic view of yet another embodiment of lens elements with light rays according to some examples of the presently disclosed subject matter.
Figure 9:
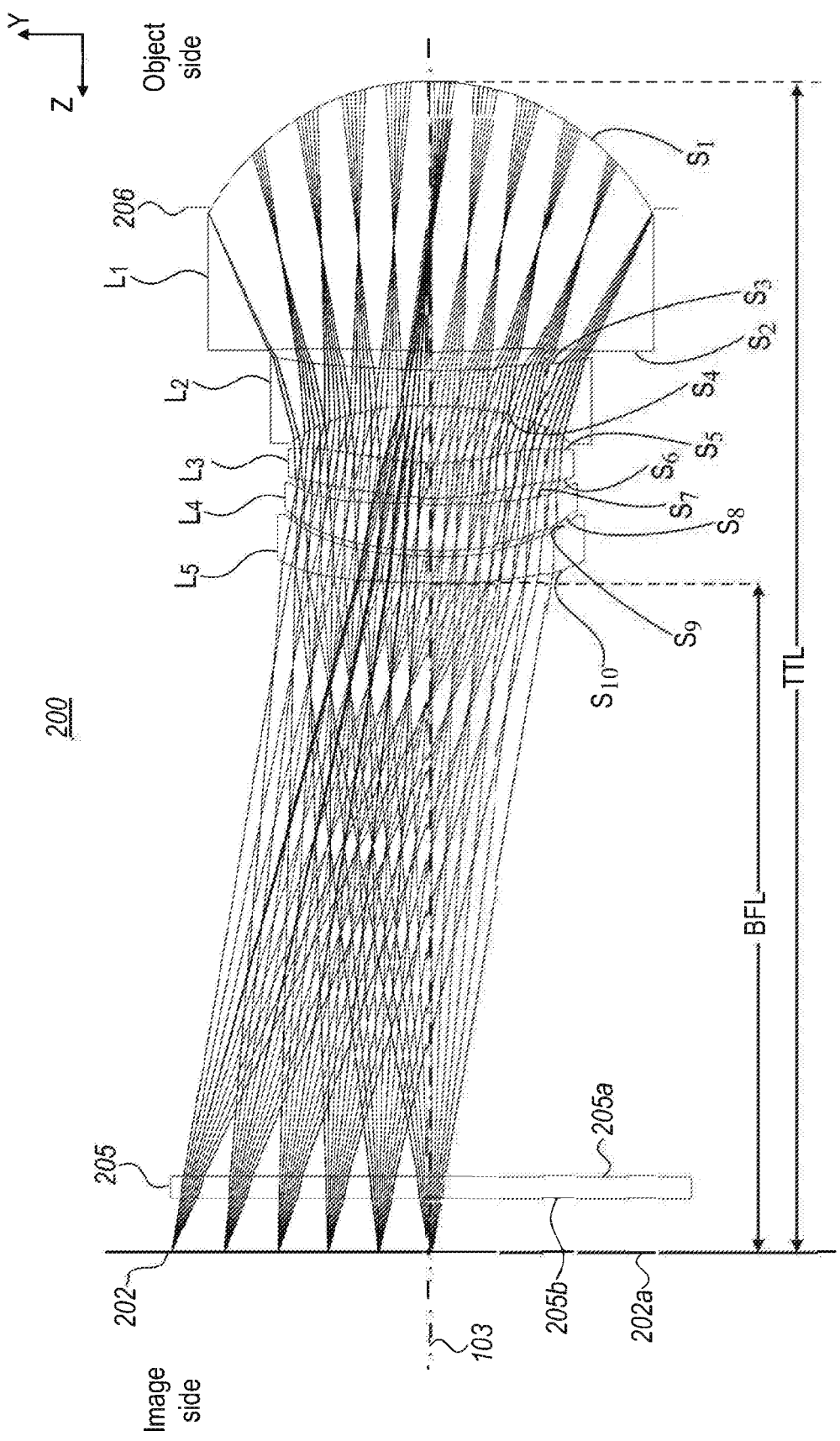
FIG. 9 is a schematic view of yet another embodiment of lens elements with light rays according to some examples of the presently disclosed subject matter.
Figure 10:
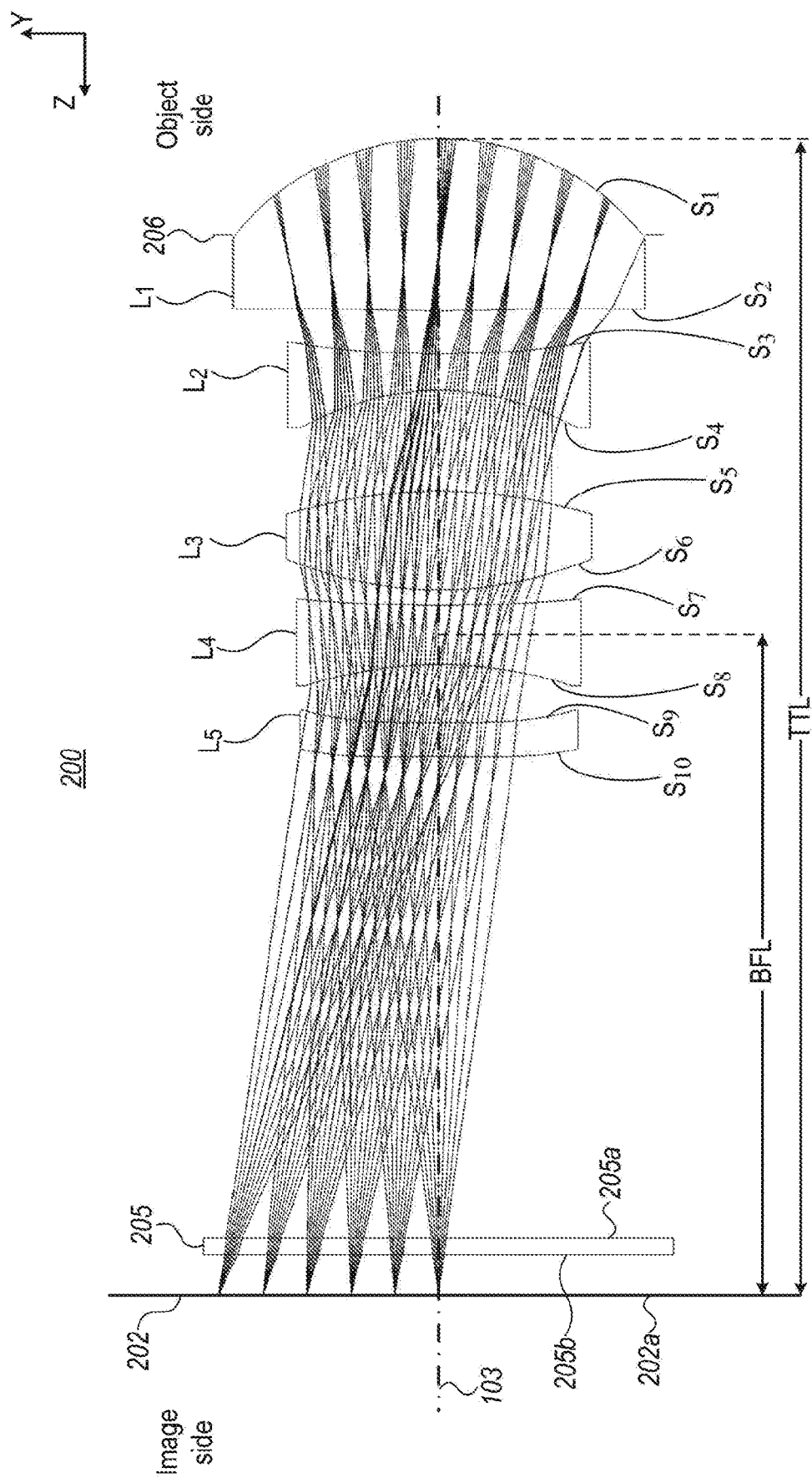
FIG. 10 is a schematic view of yet another embodiment of lens elements with light rays according to some examples of the presently disclosed subject matter.
Figure 11:
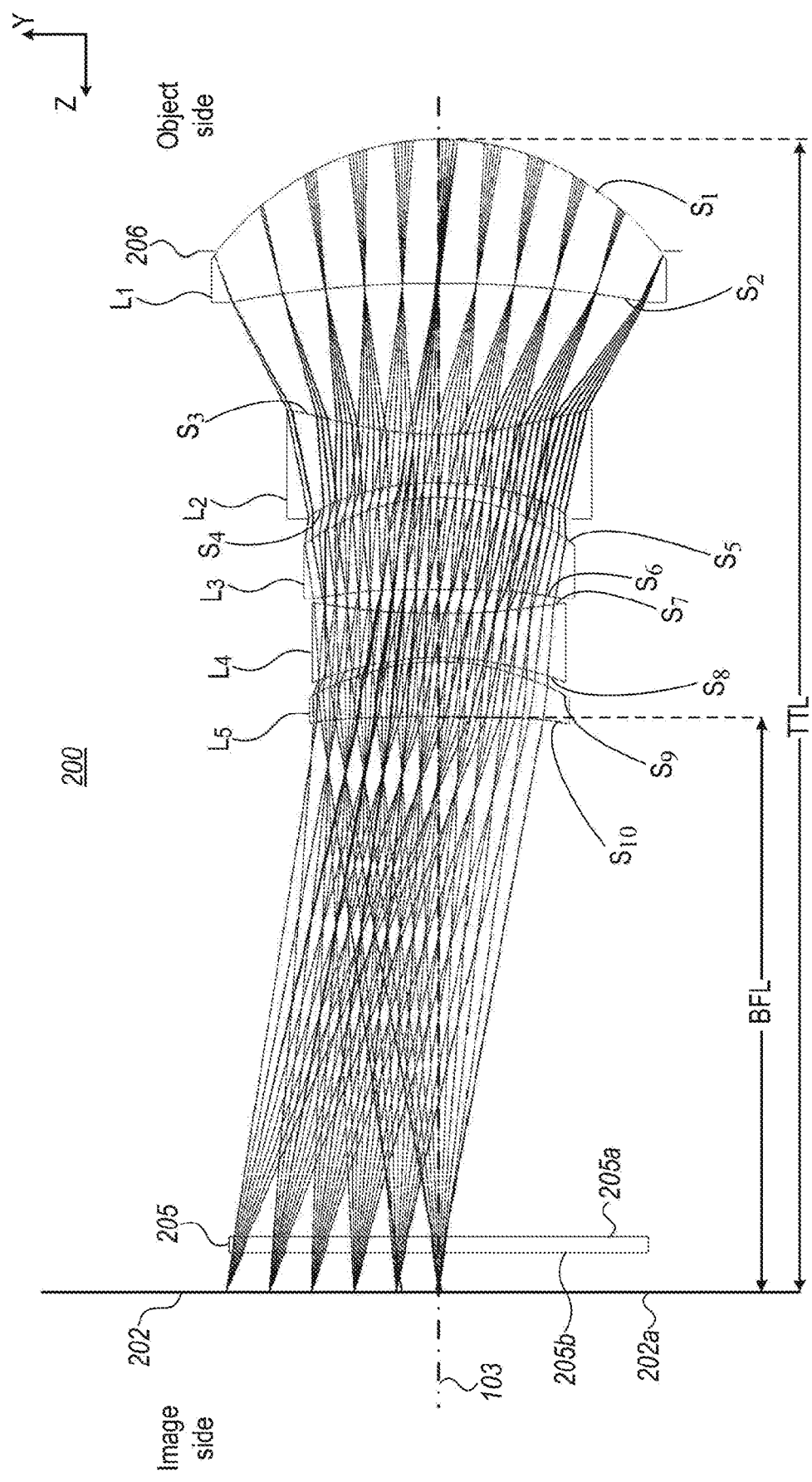
FIG. 11 is a schematic view of yet another embodiment of lens elements with light rays according to some examples of the presently disclosed subject matter.
Figure 12:
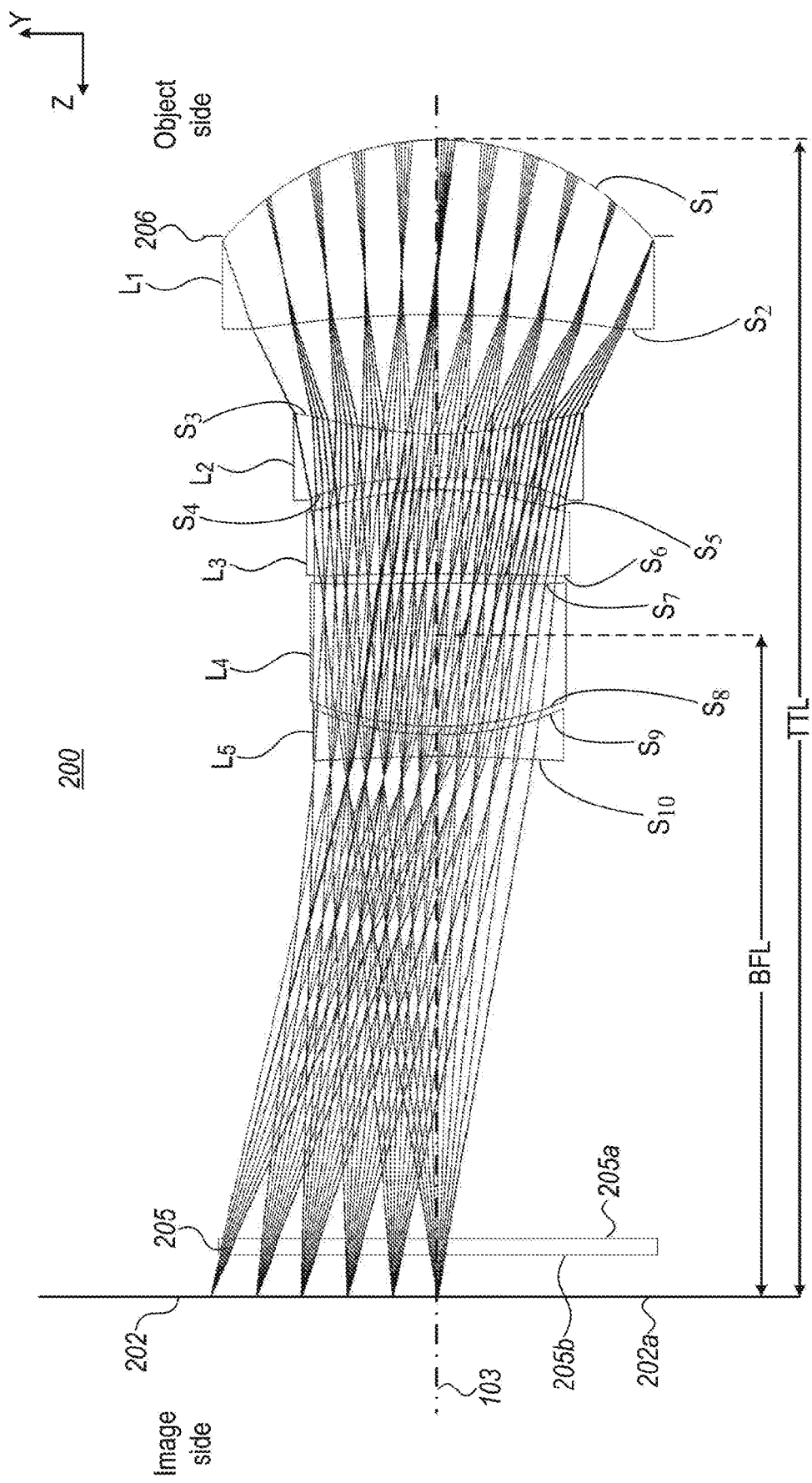
FIG. 12 is a schematic view of yet another embodiment of lens elements with light rays according to some examples of the presently disclosed subject matter.
Figure 13:
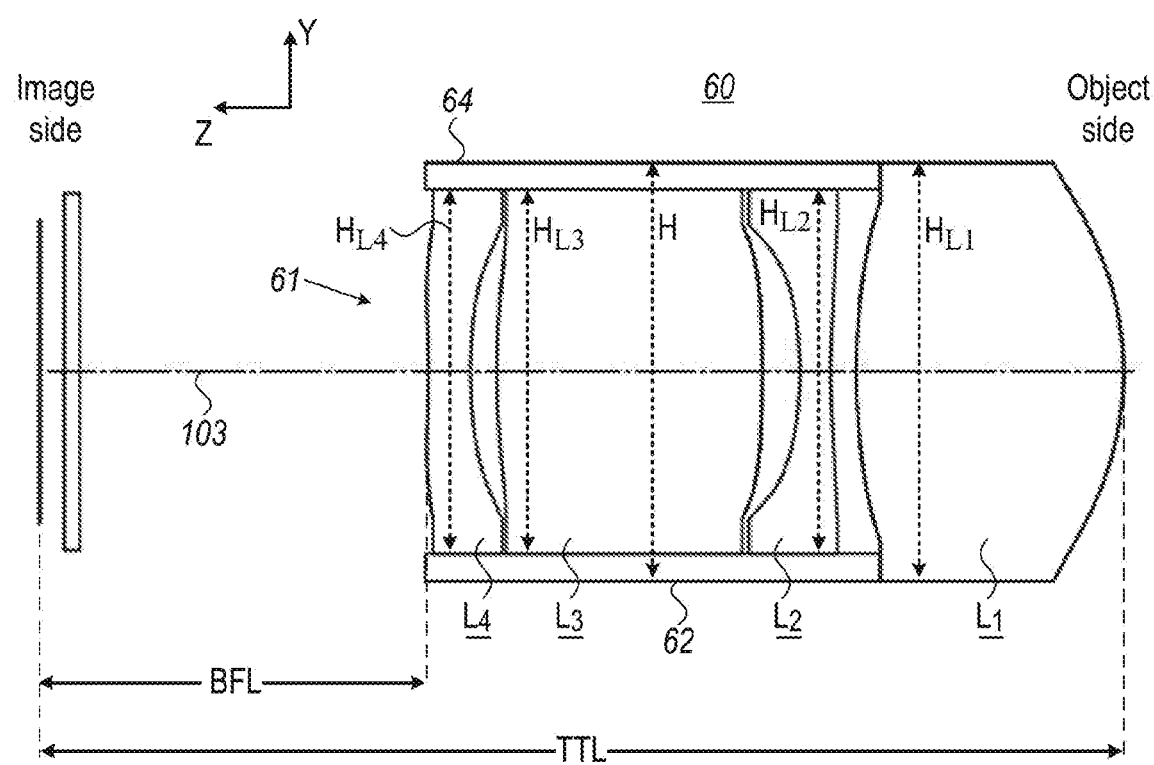
FIG. 13 is a schematic representation of a side view of an optical lens module for holding the lens elements, according to some examples of the presently disclosed subject matter.
Figure 14A:
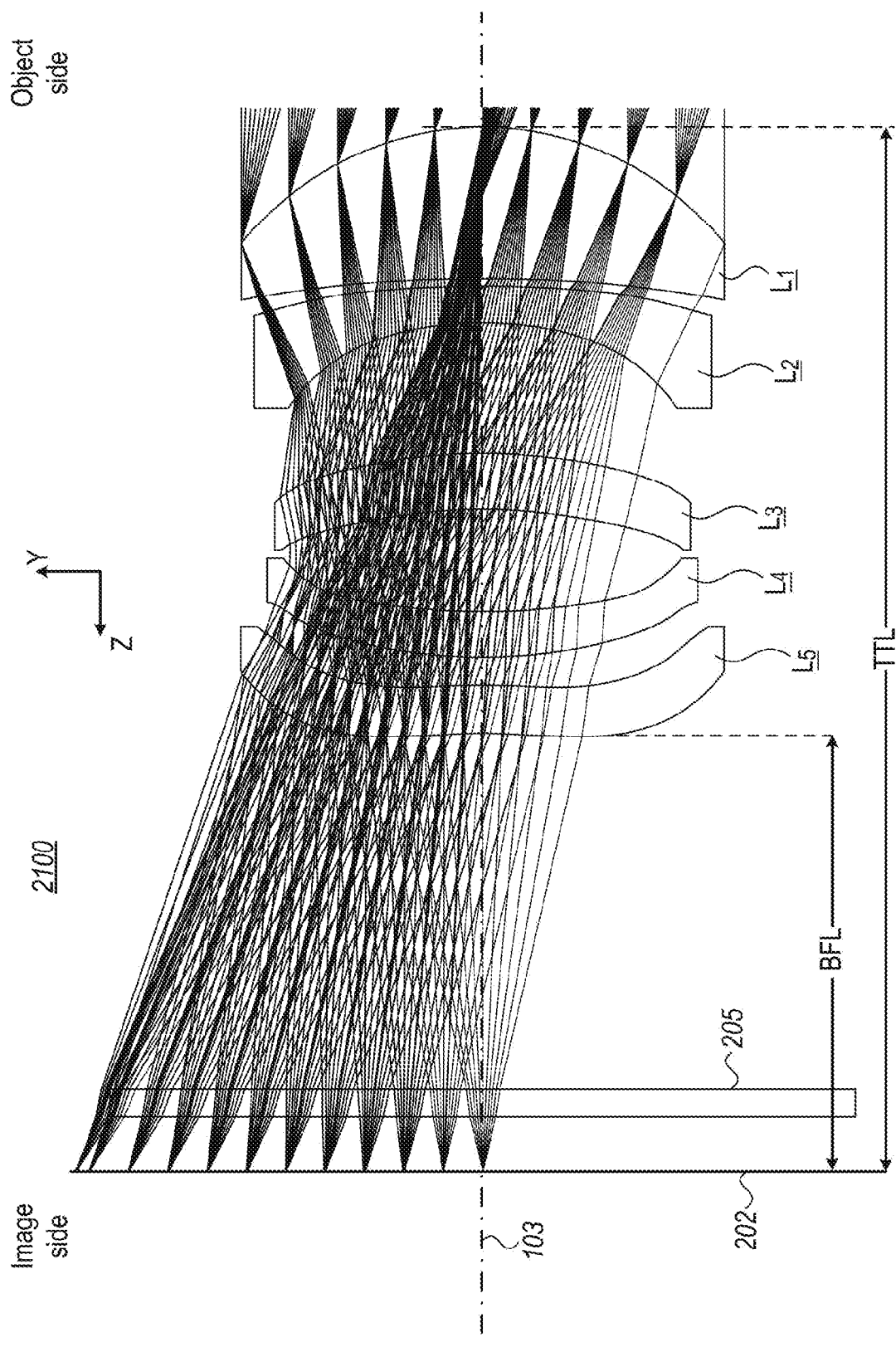
FIG. 14A is a schematic view of another embodiment of lens elements showing light rays, according to another example of the presently disclosed subject matter.
Figure 14B:
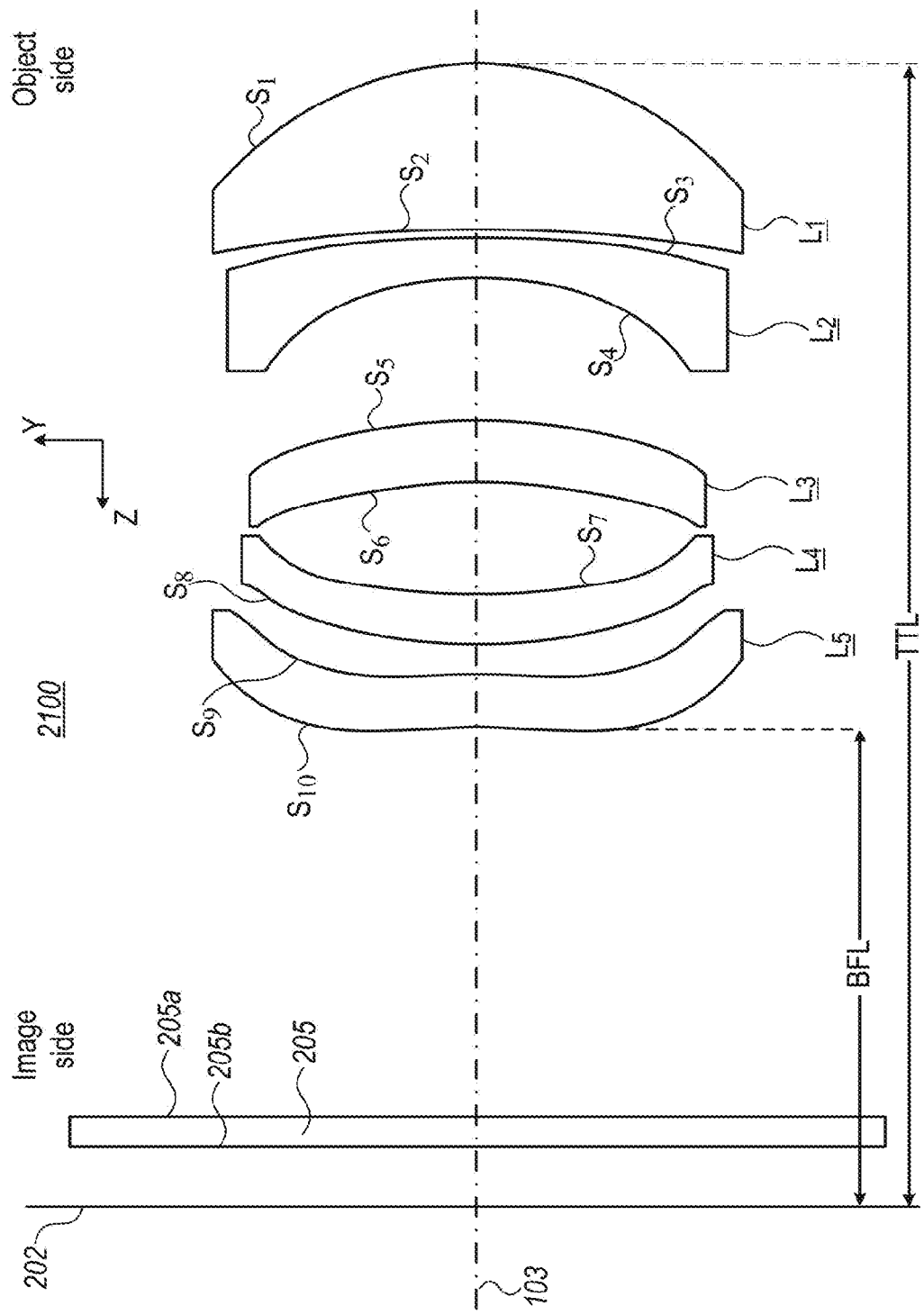
FIG. 14B is another schematic view of the lens elements of FIG. 14A.

Attention is drawn to FIG. 5. According to the presently disclosed subject matter, a clear aperture $CA(S_k)$ is defined for each given surface $S_k$ (for $1 \le k \le 2N$), as the diameter of a circle, wherein the circle is the smallest possible circle located in a plane P orthogonal to the optical axis 103 and encircling all orthogonal projections $IP_{orth}$ of all impact points on plane P. As mentioned above with respect to $CH(S_k)$, it is noted that the definition of $CA(S_k)$ also does not depend on the object which is currently imaged.

As shown in FIG. 5, the circumscribed orthogonal projection $IP_{orth}$ of all impact points IP on plane P is circle 500. The diameter of this circle 500 defines $CA(S_k)$.

Detailed optical data and surface data are given in tables below for ten lens (or lens assembly) examples (embodiments) numbered as Ex1, Ex2, . . . Ex 10. The ten lens assembly embodiments Ex1 to Ex10 are also shown in, respectively, FIGS. 2, 6, 7, 8, 9, 10, 11, 12, 13 and 14.

Characteristics Description Tables

Tables 1, 4, 7, 10, 13, 16, 19, 22, 25 and 28 provide respectively a summary of lens properties for each of examples 1-10. For each lens, the following parameters are described:
  Effective focal length (EFL), in millimeters (mm).
  Total track length (TTL), in mm, defined as the distance from the first surface $S_1$ of the first lens element to the image sensor. In some embodiments, an optical window is positioned in, and included in the TTL.
  f number f/#, (unitless number).
  Image sensor diagonal length (SDL), in mm.
  Back focal length (BFL), in mm, which is the distance from the last surface of the last lens element $S_{2N}$ to the image sensor. In some embodiments, an optical window is positioned in, and included in the BFL.
  Ratio between the TTL and the EFL, TTL/EFL.
  Ratio between the BFL and the EFL, BFL/EFL.
  Ratio between the clear aperture (CA) of the first surface $S_1$ of the first lens element and the clear aperture of the first surface $S_3$ of the second lens element, $CA(S_1)/CA(S_3)$.
  Focal length of each lens element, $f_i$.

Surface Parameters Tables

Tables 2, 5, 8, 11, 14, 17, 20, 23, 26 and 29 provide respectively a description of the surfaces of each element for each of embodiments Ex 1, Ex2, . . . Ex 10. For each lens element and each surface, the following parameters are described:
  Surface type (see below).
  The lens element number L and surface number.
  The surface radius in mm, infinity means flat surface.
  The thickness between surface i to surface i+1.
  The surface refraction index Nd.
  The surface abbe number Vd.
  The surface half diameter D/2.

Aspheric Surface Coefficients Tables:

Tables 3, 6, 9, 12, 15, 18, 21, 24, 27 and 30 provide respectively a further description of aspheric surfaces of each lens element in each of embodiments Ex 1, Ex2, . . . Ex 10.

Surface Types a) Q type 1 surface sag formula:

$$z = \frac{cr^2}{1 + \sqrt{1 - (1+k)c^2 r^2}} + D_{con}(u)$$

$$D_{con}(u) = u^4 \sum_{n=0}^{N} A_n Q_n^{con}(u^2)$$

$$u = \frac{r}{r_{max}}, \quad x = u^2$$

-continued $$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

where $\{z, r\}$ are the standard cylindrical polar coordinates, c is the paraxial curvature of the surface, k is the conic parameter, $r_{max}$ is one half of the surfaces clear aperture, and $A_n$ are the polynomial coefficients shown in lens data tables.

b) Even aspheric surfaces formula:

The equation of the surface profiles of each surface $S_k$ (for k between 1 and 2N) is expressed by:

$$z = \frac{cr^2}{1 + \sqrt{1 - (1+k)c^2 r^2}} + A_1 r^4 + A_2 r^6 + A_3 r^8 + A_4 r^{10} + A_5 r^{12} + A_6 r^{14} + A_7 r^{16}$$

where "z" is the position of the profile of the surface $S_k$ measured along optical axis 103 (coinciding with the Z axis, wherein z=0 corresponds to the intersection of the profile of the surface $S_k$ with the Z axis), "r" is the distance from optical axis 103 (measured along an axis which is perpendicular to optical axis 103), "K" is the conic coefficient, c=1/R where R is the radius of curvature, and $A_n$ (n from 1 to 7) are coefficients given in Tables 2 and 4 for each surface $S_k$. The maximum value of r, "max r", is equal to D/2.

c) Flat surface;

d) Stop.

The values provided for these examples are purely illustrative and according to other examples, other values can be used.

In the tables below, the units of the radius of curvature ("R"), the lens element thickness ("T") and the clear aperture are expressed in millimeters.

Line "0" of Tables 1, 3 and 5 and 7 describes parameters associated to the object (not visible in the figures); the object is being placed at 1 km from the system, considered to be an infinite distance.

Lines "1" to "8" of Tables 1 to 4 describe respectively parameters associated to surfaces $S_1$ to $S_8$. Lines "1" to "10" of Tables 5 to 8 describe respectively parameters associated with surfaces $S_1$ to $S_{10}$.

Lines "9", "10" and "11" of Tables 1 and 3, and lines "11", "12" and "13" in Tables 5 and 7 describe respectively parameters associated with surfaces 205a, 205b of optical element 205 and of a surface 202a of the image sensor 202.

In lines "i" of Tables 1, 3 and 5 (with i between 1 and 10 in tables 1 and 3 and i between 1 and 12 in Table 5), the thickness corresponds to the distance between surface $S_i$ and surface $S_{i+1}$, measured along the optical axis 103 (which coincides with the Z axis).

In line "11" of Tables 1, 3 (line "13" in Tables 5 and 7), the thickness is equal to zero, since this corresponds to the last surface 202a.

EXAMPLE 1

TABLE 1

| | |
|---|---|
| EFL | 13.809 |
| TTL | 13.612 |
| F/# | 2.735 |
| SDL/2 | 2.930 |
| BFL | 4.932 |
| TTL/EFL | 0.986 |
| BFL/TTL | 0.362 |
| $CA(S_1)/CA(S_3)$ | 1.310 |
| $T(AS\ to\ S_3)/TTL$ | 0.204 |
| $SDL/CA(S_{2N})$ | 1.503 |
| $f_1$ | 5.594 |
| $f_2$ | -4.823 |
| $f_3$ | 9.088 |
| $f_4$ | -10.440 |

TABLE 2

| # | Surface Type | Comment | | R | T | Material | CA/2 | K |
|---|---|---|---|---|---|---|---|---|
| 0 | | | | Infinity | 1.00E+06 | | | |
| 1 | Evn-asph | $L_1$ | $S_1$ | 4.018 | 3.122 | K26R | 2.50 | -0.918 |
| 2 | Evn-asph | | $S_2$ | -8.544 | 0.427 | | 2.20 | -13.319 |
| 3 | Evn-asph | $L_2$ | $S_3$ | -11.602 | 0.383 | EP6000 | 1.90 | -68.256 |
| 4 | Evn-asph | | $S_4$ | 4.252 | 0.668 | | 1.90 | 0.035 |
| 5 | Evn-asph | $L_3$ | $S_5$ | 12.410 | 3.072 | EP6000 | 1.90 | 9.316 |
| 6 | Evn-asph | | $S_6$ | -9.884 | 0.565 | | 1.90 | -50.842 |
| 7 | Evn-asph | $L_4$ | $S_7$ | -5.080 | 0.434 | K26R | 1.90 | -30.682 |
| 8 | Evn-asph | | $S_8$ | -57.279 | 4.429 | | 1.90 | -207.271 |
| 9 | Flat | | | Infinity | 0.210 | BK7 | | |
| 10 | Flat | | | Infinity | 0.289 | | | |
| 11 | Flat | | | Infinity | 0.000 | | | |

TABLE 3

| # | A1 | A2 | A3 | A4 | A5 | A6 | A7 |
|---|---|---|---|---|---|---|---|
| 1 | 1.0982E-03 | -5.6900E-05 | 3.0019E-06 | -3.0442E-07 | -2.0532E-07 | 2.1748E-08 | -2.5134E-09 |
| 2 | 1.4662E-03 | -6.8269E-04 | 3.6775E-05 | 1.2874E-07 | -1.5311E-06 | 1.6528E-07 | 0.0000E+00 |
| 3 | -4.4641E-03 | 2.3303E-03 | -6.0231E-04 | 5.0714E-05 | 2.4477E-06 | -3.4785E-07 | -1.2814E-08 |
| 4 | -4.6819E-03 | 2.7039E-03 | -4.9103E-04 | -6.1960E-05 | 4.4187E-05 | -5.1739E-06 | 0.0000E+00 |
| 5 | -8.9765E-04 | 2.5621E-04 | -1.2915E-04 | -5.1021E-06 | 9.6811E-06 | -1.2420E-06 | 0.0000E+00 |
| 6 | -2.6288E-03 | 8.0824E-04 | -4.4175E-05 | -1.8619E-05 | -1.2620E-05 | 4.5041E-06 | 0.0000E+00 |
| 7 | -4.3474E-02 | 8.7969E-03 | -7.7260E-04 | -2.7259E-04 | 1.8367E-05 | 9.9215E-06 | 0.0000E+00 |
| 8 | -1.9365E-02 | 1.5956E-03 | 3.4614E-04 | -1.1796E-04 | -1.3790E-05 | 5.9480E-06 | -2.5281E-07 |

EXAMPLE 2

TABLE 4

| | |
|---|---|
| EFL | 15.001 |
| TTL | 14.472 |
| F/# | 2.727 |
| SDL/2 | 2.930 |
| BFL | 7.617 |
| TTL/EFL | 0.965 |
| BFL/TTL | 0.526 |
| $CA(S_1)/CA(S_3)$ | 1.408 |
| $T(AS\ to\ S_3)/TTL$ | 0.157 |
| $SDL/CA(S_{2N})$ | 1.577 |
| $f_1$ | 6.359 |
| $f_2$ | -4.495 |
| $f_3$ | 48.439 |
| $f_4$ | 9.909 |
| $f_5$ | -20.537 |

TABLE 5

| Surface # | Surface Type | Comments | | Radius | T | Nd | Vd | D/2 |
|---|---|---|---|---|---|---|---|---|
| 1 | Stop | stop | | Infinity | -1.097 | | | 2.750 |
| 2 | QED_TYPE_1 | $L_1$ | $S_1$ | 3.845 | 2.374 | 1.516 | 64.060 | 2.751 |
| 3 | QED_TYPE_1 | | $S_2$ | -17.752 | 0.989 | | | 2.396 |
| 4 | QED_TYPE_1 | $L_2$ | $S_3$ | -16.427 | 0.385 | 1.640 | 23.523 | 1.954 |
| 5 | QED_TYPE_1 | | $S_4$ | 3.518 | 0.512 | | | 1.758 |

TABLE 5-continued

| Surface # | Surface Type | Comments | | Radius | T | Nd | Vd | D/2 |
|---|---|---|---|---|---|---|---|---|
| 6 | QED_TYPE_1 | L₃ | S₅ | −21.654 | 0.905 | 1.640 | 23.523 | 1.766 |
| 7 | QED_TYPE_1 | | S₆ | −12.955 | 0.215 | | | 1.786 |
| 8 | QED_TYPE_1 | L₄ | S₇ | 7.957 | 0.951 | 1.640 | 23.523 | 1.847 |
| 9 | QED_TYPE_1 | | S₈ | −29.721 | 0.272 | | | 1.838 |
| 10 | QED_TYPE_1 | L₅ | S₉ | −4.061 | 0.252 | 1.535 | 55.664 | 1.831 |
| 11 | QED_TYPE_1 | | S₁₀ | −6.584 | 6.907 | | | 1.858 |
| 12 | STANDARD | IR Cut-Off | | Infinity | 0.210 | 1.517 | 64.167 | 3.103 |
| 13 | STANDARD | | | Infinity | 0.500 | | | 3.135 |
| 14 | Image | | | Infinity | — | | | 3.224 |

TABLE 6

| # | k | Max Radius | A0 | A1 | A2 | A3 | A4 | A5 |
|---|---|---|---|---|---|---|---|---|
| 2 | 0.074 | 2.813 | −2.93E−02 | −3.38E−03 | −7.24E−04 | −1.58E−04 | −4.67E−05 | −5.95E−06 |
| 3 | −14.808 | 2.456 | 1.35E−01 | −9.43E−03 | 6.14E−04 | −5.91E−05 | 6.47E−06 | 2.94E−06 |
| 4 | −260.952 | 2.038 | 3.85E−02 | 1.69E−03 | −1.58E−03 | 9.57E−04 | −2.90E−04 | 8.48E−05 |
| 5 | 0.865 | 1.803 | 1.21E−02 | 1.04E−02 | −4.00E−04 | 7.26E−04 | −1.63E−04 | −1.71E−05 |
| 6 | 118.036 | 2.901 | 3.26E−01 | −4.74E−01 | −1.21E−01 | 1.12E−02 | 2.07E−02 | 2.56E−03 |
| 7 | −91.610 | 1.824 | 1.84E−01 | −1.92E−02 | 4.09E−03 | −3.58E−03 | 3.80E−03 | 1.15E−04 |
| 8 | −0.881 | 1.858 | 1.38E−02 | −2.60E−03 | 8.05E−03 | −3.43E−03 | 3.72E−04 | 1.36E−04 |
| 9 | 178.397 | 1.885 | −5.13E−02 | 1.21E−02 | 3.82E−03 | −1.39E−03 | −2.96E−04 | 2.58E−04 |
| 10 | −6.965 | 1.883 | 4.37E−02 | −1.76E−02 | 1.08E−03 | −5.19E−04 | −4.49E−04 | 2.28E−04 |
| 11 | −4.710 | 1.939 | 1.13E−01 | −2.82E−02 | 1.39E−03 | 3.11E−04 | −2.07E−04 | 2.98E−05 |

EXAMPLE 3

TABLE 7

| EFL | 10.911 |
|---|---|
| TTL | 10.585 |
| F/# | 2.819 |
| SDL/2 | 2.620 |
| BFL | 5.000 |
| TTL/EFL | 0.970 |
| BFL/TTL | 0.472 |

TABLE 7-continued

| CA(S₁)/CA(S₃) | 1.212 |
|---|---|
| T(AS to S₃)/TTL | 0.113 |
| SDL/CA(S₂ₙ) | 1.678 |
| f₁ | 4.519 |
| f₂ | −3.153 |
| f₃ | 3.343 |
| f₄ | −5.268 |
| f₅ | −35.623 |

TABLE 8

| Surface # | Surface Type | Comments | | Radius | T | Nd | Vd | D/2 |
|---|---|---|---|---|---|---|---|---|
| 1 | Stop | Stop | | Infinity | −0.778 | | | 1.935 |
| 2 | QED_TYPE_1 | L₁ | S₁ | 2.743 | 1.586 | 1.535 | 55.664 | 1.940 |
| 3 | QED_TYPE_1 | | S₂ | −16.221 | 0.386 | | | 1.722 |
| 4 | QED_TYPE_1 | L₂ | S₃ | −12.522 | 0.353 | 1.640 | 23.523 | 1.601 |
| 5 | QED_TYPE_1 | | S₄ | 2.431 | 0.863 | | | 1.444 |
| 6 | QED_TYPE_1 | L₃ | S₅ | 4.625 | 0.917 | 1.640 | 23.523 | 1.562 |
| 7 | QED_TYPE_1 | | S₆ | −3.670 | 0.122 | | | 1.562 |
| 8 | QED_TYPE_1 | L₄ | S₇ | −13.647 | 0.541 | 1.640 | 23.523 | 1.460 |
| 9 | QED_TYPE_1 | | S₈ | 4.544 | 0.455 | | | 1.433 |
| 10 | QED_TYPE_1 | L₅ | S₉ | −66.355 | 0.362 | 1.535 | 55.664 | 1.443 |
| 11 | QED_TYPE_1 | | S₁₀ | 26.775 | 4.290 | | | 1.561 |
| 12 | STANDARD | IR Cut-Off | | Infinity | 0.210 | 1.517 | 64.167 | 2.577 |
| 13 | STANDARD | | | Infinity | 0.500 | | | 2.608 |
| 14 | Image | | | Infinity | — | | | 2.722 |

TABLE 9

| # | k | Max Radius | A0 | A1 | A2 | A3 | A4 | A5 |
|---|---|---|---|---|---|---|---|---|
| 2 | 0.074 | 2.813 | −2.93E−02 | −3.38E−03 | −7.24E−04 | −1.58E−04 | −4.67E−05 | −5.95E−06 |
| 3 | −14.808 | 2.456 | 1.35E−01 | −9.43E−03 | 6.14E−04 | −5.91E−05 | 6.47E−06 | 2.94E−06 |
| 4 | −260.952 | 2.038 | 3.85E−02 | 1.69E−03 | −1.58E−03 | 9.57E−04 | −2.90E−04 | 8.48E−05 |
| 5 | 0.865 | 1.803 | 1.21E−02 | 1.04E−02 | −4.00E−04 | 7.26E−04 | −1.63E−04 | −1.71E−05 |

TABLE 9-continued

| # | k | Max Radius | A0 | A1 | A2 | A3 | A4 | A5 |
|---|---|---|---|---|---|---|---|---|
| 6 | 118.036 | 2.901 | 3.26E−01 | −4.74E−01 | −1.21E−01 | 1.12E−02 | 2.07E−02 | 2.56E−03 |
| 7 | −91.610 | 1.824 | 1.84E−01 | −1.92E−02 | 4.09E−03 | −3.58E−03 | 3.80E−04 | 1.15E−04 |
| 8 | −0.881 | 1.858 | 1.38E−02 | −2.60E−03 | 8.05E−03 | −3.43E−03 | 3.72E−04 | 1.36E−04 |
| 9 | 178.397 | 1.885 | −5.13E−02 | 1.21E−02 | 3.82E−03 | −1.39E−03 | −2.96E−04 | 2.58E−04 |
| 10 | −6.965 | 1.883 | 4.37E−02 | −1.76E−02 | 1.08E−03 | −5.19E−04 | −4.49E−04 | 2.28E−04 |
| 11 | −4.710 | 1.939 | 1.13E−01 | −2.82E−02 | 1.39E−03 | 3.11E−04 | −2.07E−04 | 2.98E−05 |

EXAMPLE 4

TABLE 10

| | |
|---|---|
| EFL | 12.166 |
| TTL | 11.856 |
| F/# | 2.704 |
| SDL/2 | 2.620 |
| BFL | 6.382 |
| TTL/EFL | 0.975 |
| BFL/TTL | 0.538 |
| CA($S_1$)/CA($S_3$) | 1.277 |
| T(AS to $S_3$)/TTL | 0.129 |
| SDL/CA($S_{2N}$) | 1.685 |
| $f_1$ | 5.426 |
| $f_2$ | −2.822 |
| $f_3$ | 3.047 |
| $f_4$ | −7.208 |
| $f_5$ | −27.026 |

EXAMPLE 5

TABLE 13

| | |
|---|---|
| EFL | 12.020 |
| TTL | 11.216 |
| F/# | 2.671 |
| SDL/2 | 2.620 |
| BFL | 6.412 |
| TTL/EFL | 0.933 |
| BFL/TTL | 0.572 |
| CA($S_1$)/CA($S_3$) | 1.388 |
| T(AS to $S_3$)/TTL | 0.138 |
| SDL/CA($S_{2N}$) | 1.692 |
| $f_1$ | 4.681 |
| $f_2$ | −4.152 |
| $f_3$ | 34.206 |
| $f_4$ | 11.682 |
| $f_5$ | −12.516 |

TABLE 11

| Surface # | Surface Type | Comments | | Radius | T | Nd | Vd | D/2 |
|---|---|---|---|---|---|---|---|---|
| 1 | Stop | | stop | Infinity | −0.978 | | | 2.250 |
| 2 | QED_TYPE_1 | $L_1$ | $S_1$ | 3.023 | 2.106 | 1.516 | 64.060 | 2.250 |
| 3 | QED_TYPE_1 | | $S_2$ | −29.206 | 0.407 | | | 1.843 |
| 4 | QED_TYPE_1 | $L_2$ | $S_3$ | −6.031 | 0.416 | 1.640 | 23.523 | 1.763 |
| 5 | QED_TYPE_1 | | $S_4$ | 2.646 | 0.332 | | | 1.568 |
| 6 | QED_TYPE_1 | $L_3$ | $S_5$ | 3.603 | 1.116 | 1.640 | 23.523 | 1.642 |
| 7 | QED_TYPE_1 | | $S_6$ | −3.735 | 0.070 | | | 1.622 |
| 8 | QED_TYPE_1 | $L_4$ | $S_7$ | −30.886 | 0.615 | 1.640 | 23.523 | 1.561 |
| 9 | QED_TYPE_1 | | $S_8$ | 5.462 | 0.119 | | | 1.554 |
| 10 | QED_TYPE_1 | $L_5$ | $S_9$ | −49.166 | 0.295 | 1.535 | 55.664 | 1.554 |
| 11 | QED_TYPE_1 | | $S_{10}$ | 20.515 | 5.672 | | | 1.555 |
| 12 | STANDARD | | IR Cut-Off | Infinity | 0.210 | 1.517 | 64.167 | 2.605 |
| 13 | STANDARD | | | Infinity | 0.500 | | | 2.631 |
| 14 | Image | | | Infinity | — | | | 2.725 |

TABLE 12

| # | k | Max Radius | A0 | A1 | A2 | A3 | A4 | A5 |
|---|---|---|---|---|---|---|---|---|
| 2 | 0.097 | 10.740 | −1.14E+00 | −3.78E−01 | −1.15E+00 | −5.05E−01 | 4.05E−02 | 2.96E−02 |
| 3 | −261.050 | 2.024 | 1.73E−01 | −2.44E−02 | 3.83E−03 | −6.77E−04 | 3.10E−04 | −3.83E−05 |
| 4 | −38.977 | 253.807 | −7.72E+04 | −6.74E+03 | −5.63E+04 | −1.10E+04 | −2.48E+03 | 7.12E+02 |
| 5 | −0.586 | 1.772 | −9.01E−02 | 4.03E−02 | −1.91E−03 | 2.21E−03 | −4.26E−04 | 1.26E−04 |
| 6 | 0.379 | 2.072 | −1.12E−01 | −1.14E−03 | −2.63E−02 | −4.36E−03 | −3.34E−03 | 3.22E−04 |
| 7 | −6.473 | 1.511 | 5.60E−02 | −2.76E−02 | 4.57E−03 | −5.15E−04 | 6.83E−06 | 2.84E−07 |
| 8 | 21.169 | 2.093 | −4.58E−01 | 9.64E−03 | 4.79E−02 | −5.53E−03 | 7.19E−03 | 2.01E−03 |
| 9 | −10.145 | 2.694 | −4.74E−01 | 1.22E−01 | −7.53E−02 | 3.93E−02 | 2.39E−02 | 3.19E−03 |
| 10 | −12510.811 | 2.547 | −2.52E−01 | −9.58E−02 | −2.01E−02 | 1.14E−02 | −6.12E−03 | 4.40E−03 |
| 11 | 104.159 | 2.013 | −2.44E−02 | −3.44E−02 | 5.39E−03 | 7.10E−03 | −1.89E−05 | 6.12E−04 |

TABLE 14

| Surface # | Surface Type | Comments | | Radius | T | Nd | Vd | D/2 |
|---|---|---|---|---|---|---|---|---|
| 1 | Stop | | stop | Infinity | -1.215 | | | 2.250 |
| 2 | QED_TYPE_1 | $L_1$ | $S_1$ | 2.692 | 2.587 | 1.516 | 64.060 | 2.254 |
| 3 | QED_TYPE_1 | | $S_2$ | -15.936 | 0.181 | | | 1.658 |
| 4 | QED_TYPE_1 | $L_2$ | $S_3$ | -9.317 | 0.339 | 1.640 | 23.523 | 1.623 |
| 5 | QED_TYPE_1 | | $S_4$ | 3.768 | 0.548 | | | 1.427 |
| 6 | QED_TYPE_1 | $L_3$ | $S_5$ | -3.081 | 0.344 | 1.640 | 23.523 | 1.431 |
| 7 | QED_TYPE_1 | | $S_6$ | -2.818 | 0.058 | | | 1.436 |
| 8 | QED_TYPE_1 | $L_4$ | $S_7$ | -12.050 | 0.443 | 1.640 | 23.523 | 1.431 |
| 9 | QED_TYPE_1 | | $S_8$ | -4.679 | 0.052 | | | 1.478 |
| 10 | QED_TYPE_1 | $L_5$ | $S_9$ | -6.654 | 0.252 | 1.535 | 55.664 | 1.467 |
| 11 | QED_TYPE_1 | | $S_{10}$ | -1131.9 | 5.702 | | | 1.549 |
| 12 | STANDARD | | IR Cut-Off | Infinity | 0.210 | 1.516 | 64.060 | 2.612 |
| 13 | STANDARD | | | Infinity | 0.500 | | | 2.637 |
| 14 | Image | | | Infinity | — | | | 2.727 |

TABLE 15

| # | k | Max Radius | A0 | A1 | A2 | A3 | A4 | A5 |
|---|---|---|---|---|---|---|---|---|
| 2 | 0.175 | 2.254 | -4.80E-02 | -7.31E-03 | -1.54E-03 | -3.16E-04 | -7.65E-05 | -1.79E-05 |
| 3 | -69.109 | 2.024 | 2.01E-01 | 3.26E-02 | 2.49E-02 | 8.80E-03 | 3.07E-03 | 2.76E-04 |
| 4 | 8.691 | 1.742 | 3.57E-02 | -1.40E-02 | 2.26E-03 | -8.42E-04 | 3.43E-04 | -3.22E-04 |
| 5 | 3.284 | 1.772 | 1.82E-01 | 8.25E-02 | 4.37E-02 | 1.90E-02 | 6.76E-03 | 5.25E-04 |
| 6 | -21.369 | 2.072 | 2.11E-01 | -5.55E-02 | -4.95E-04 | 5.96E-02 | 3.38E-02 | 1.00E-02 |
| 7 | -9.992 | 1.511 | 7.69E-02 | -1.67E-02 | 5.04E-03 | -1.17E-03 | -1.05E-03 | 4.58E-05 |
| 8 | 58.607 | 2.093 | -2.42E-01 | 1.14E-01 | 8.63E-02 | -2.04E-03 | 1.40E-02 | 7.34E-03 |
| 9 | -26.270 | 2.694 | -7.16E-01 | 4.52E-01 | -1.20E-01 | 1.99E-02 | 1.30E-01 | 6.23E-02 |
| 10 | -100.550 | 2.547 | -2.11E+00 | -2.56E-01 | -1.63E-01 | 8.43E-02 | 4.58E-02 | 3.64E-02 |
| 11 | 99.618 | 2.013 | -6.20E-01 | -2.06E-03 | -9.25E-03 | 8.76E-03 | 1.55E-03 | 1.46E-03 |

EXAMPLE 6

TABLE 16

| EFL | 15.000 |
|---|---|
| TTL | 14.507 |
| F/# | 2.727 |
| SDL/2 | 2.930 |
| BFL | 6.750 |
| TTL/EFL | 0.967 |
| BFL/TTL | 0.465 |

TABLE 16-continued

| $CA(S_1)/CA(S_3)$ | 1.361 |
|---|---|
| $T(AS\ to\ S_3)/TTL$ | 0.103 |
| $SDL/CA(S_{2N})$ | 1.581 |
| $f_1$ | 6.186 |
| $f_2$ | -4.313 |
| $f_3$ | 4.578 |
| $f_4$ | -7.114 |
| $f_5$ | -48.010 |

TABLE 17

| Surface # | Surface Type | Comments | | Radius | T | Nd | Vd | D/2 |
|---|---|---|---|---|---|---|---|---|
| 1 | Stop | | stop | Infinity | -1.203 | | | 2.750 |
| 2 | QED_TYPE_1 | $L_1$ | $S_1$ | 3.750 | 2.162 | 1.535 | 55.664 | 2.742 |
| 3 | QED_TYPE_1 | | $S_2$ | -22.438 | 0.539 | | | 2.315 |
| 4 | QED_TYPE_1 | $L_2$ | $S_3$ | -17.108 | 0.457 | 1.640 | 23.523 | 2.015 |
| 5 | QED_TYPE_1 | | $S_4$ | 3.324 | 1.262 | | | 1.829 |
| 6 | QED_TYPE_1 | $L_3$ | $S_5$ | 6.131 | 1.245 | 1.640 | 23.523 | 2.029 |
| 7 | QED_TYPE_1 | | $S_6$ | -5.162 | 0.187 | | | 2.030 |
| 8 | QED_TYPE_1 | $L_4$ | $S_7$ | -20.030 | 0.751 | 1.640 | 23.523 | 1.891 |
| 9 | QED_TYPE_1 | | $S_8$ | 5.975 | 0.730 | | | 1.777 |
| 10 | QED_TYPE_1 | $L_5$ | $S_9$ | -101.515 | 0.424 | 1.535 | 55.664 | 1.790 |
| 11 | QED_TYPE_1 | | $S_{10}$ | 34.419 | 6.040 | | | 1.854 |
| 12 | STANDARD | | IR Cut-Off | Infinity | 0.210 | 1.517 | 64.167 | 3.102 |
| 13 | STANDARD | | | Infinity | 0.500 | | | 3.130 |
| 14 | Image | | | Infinity | — | | | 3.232 |

TABLE 18

| # | k | Max Radius | A0 | A1 | A2 | A3 | A4 | A5 |
|---|---|---|---|---|---|---|---|---|
| 2 | −0.164 | 3.223 | 2.50E−01 | 8.12E−02 | 2.71E−02 | 7.56E−03 | 1.60E−03 | 2.07E−04 |
| 3 | 53.332 | 2.702 | 2.22E−01 | −9.60E−03 | 2.41E−03 | −1.18E−03 | 2.91E−05 | −6.96E−05 |
| 4 | 45.903 | 2.268 | −5.44E−03 | 1.88E−02 | −2.59E−03 | 1.22E−03 | −7.59E−05 | 8.13E−05 |
| 5 | 0.186 | 1.948 | −1.15E−01 | 1.98E−02 | −2.50E−03 | 7.16E−04 | −7.79E−05 | 1.74E−05 |
| 6 | 0.869 | 2.132 | −7.40E−02 | 2.05E−03 | 5.01E−04 | 9.64E−04 | 5.64E−05 | −2.93E−05 |
| 7 | −1.245 | 2.101 | 1.29E−02 | −1.11E−02 | 3.57E−03 | 1.04E−04 | −5.70E−05 | 2.15E−05 |
| 8 | −61.046 | 2.042 | 1.91E−03 | −7.33E−03 | 4.02E−03 | −1.04E−03 | −1.78E−04 | 4.51E−05 |
| 9 | 2.955 | 2.200 | −4.49E−02 | 3.68E−03 | −1.90E−03 | −1.26E−03 | 7.28E−04 | 2.56E−04 |
| 10 | 1130.310 | 2.180 | −3.03E−01 | 5.71E−03 | −7.06E−03 | −5.26E−04 | 6.41E−04 | 1.72E−04 |
| 11 | −793.748 | 2.244 | −3.17E−01 | −1.03E−03 | −5.39E−03 | −1.63E−05 | 3.23E−04 | 2.47E−05 |

EXAMPLE 7

TABLE 19

| EFL | 16.142 |
|---|---|
| TTL | 14.963 |
| F/# | 2.612 |
| SDL/2 | 2.930 |
| BFL | 7.459 |
| TTL/EFL | 0.927 |
| BFL/TTL | 0.498 |
| $CA(S_1)/CA(S_3)$ | 1.489 |
| $T(AS \text{ to } S_3)/TTL$ | 0.160 |
| $SDL/CA(S_{2N})$ | 1.635 |
| $f_1$ | 8.251 |
| $f_2$ | −3.476 |
| $f_3$ | 5.637 |
| $f_4$ | −5.582 |
| $f_5$ | 5.558 |

EXAMPLE 8

TABLE 22

| EFL | 14.955 |
|---|---|
| TTL | 14.056 |
| F/# | 2.690 |
| SDL/2 | 2.930 |
| BFL | 6.566 |
| EFL | 0.940 |
| BFL/TTL | 0.467 |
| $CA(S_1)/CA(S_3)$ | 1.489 |
| $T(AS \text{ to } S_3)/TTL$ | 0.171 |
| $SDL/CA(S_{2N})$ | 1.811 |
| f1 | 7.731 |
| f2 | −4.271 |
| f3 | 8.905 |
| f4 | 6.428 |
| f5 | −6.636 |

TABLE 20

| Surface # | Surface Type | Comments | | Radius | T | Nd | Vd | D/2 |
|---|---|---|---|---|---|---|---|---|
| 1 | Stop | | stop | Infinity | −1.442 | | | 3.090 |
| 2 | STANDARD | $L_1$ | $S_1$ | 3.945 | 1.865 | 1.589 | 61.248 | 3.130 |
| 3 | STANDARD | | $S_2$ | 17.262 | 1.965 | | | 2.884 |
| 4 | QED_TYPE_1 | $L_2$ | $S_3$ | −4.663 | 0.629 | 1.636 | 23.972 | 2.101 |
| 5 | QED_TYPE_1 | | $S_4$ | 4.419 | 0.185 | | | 1.824 |
| 6 | QED_TYPE_1 | $L_3$ | $S_5$ | 2.756 | 1.192 | 1.535 | 55.664 | 1.870 |
| 7 | QED_TYPE_1 | | $S_6$ | 27.278 | 0.319 | | | 1.756 |
| 8 | QED_TYPE_1 | $L_4$ | $S_7$ | −11.519 | 0.575 | 1.535 | 55.664 | 1.748 |
| 9 | QED_TYPE_1 | | $S_8$ | 4.100 | 0.055 | | | 1.747 |
| 10 | QED_TYPE_1 | $L_5$ | $S_9$ | 3.251 | 0.718 | 1.636 | 23.972 | 1.792 |
| 11 | QED_TYPE_1 | | $S_{10}$ | 37.292 | 6.749 | | | 1.759 |
| 12 | STANDARD | | IR Cut-Off | Infinity | 0.210 | 1.517 | 64.167 | 2.863 |
| 13 | STANDARD | | | Infinity | 0.500 | | | 2.887 |
| 14 | Image | | | Infinity | — | | | 2.934 |

TABLE 21

| # | k | Max Radius | A0 | A1 | A2 | A3 | A4 | A5 |
|---|---|---|---|---|---|---|---|---|
| 4 | −6.573 | 2.16E+00 | 6.88E−02 | 2.54E−03 | −7.99E−04 | 3.80E−04 | −1.10E−05 | 1.47E−06 |
| 5 | −7.356 | 1.85E+00 | 1.42E−01 | 2.30E−02 | 3.12E−03 | 1.37E−03 | 6.79E−06 | −8.67E−07 |
| 6 | −3.503 | 1.91E+00 | 1.23E−01 | 2.61E−03 | 1.79E−03 | 1.53E−05 | 1.50E−05 | −2.00E−06 |
| 7 | 16.927 | 1.84E+00 | 8.37E−02 | −1.69E−02 | −1.54E−03 | −1.01E−04 | −1.93E−10 | 1.09E−10 |
| 8 | −52.143 | 1.75E+00 | −3.24E−02 | 4.94E−03 | −9.10E−04 | −9.67E−04 | −2.75E−06 | 3.61E−07 |
| 9 | −7.394 | 1.75E+00 | 1.79E−02 | 3.64E−03 | 3.21E−03 | −1.54E−03 | 7.37E−06 | −9.61E−07 |
| 10 | −4.914 | 1.79E+00 | 6.31E−02 | 2.69E−03 | 4.54E−03 | −4.47E−04 | 1.06E−05 | −1.40E−06 |
| 11 | −436.851 | 1.76E+00 | 3.81E−02 | 5.36E−03 | 1.79E−03 | 6.74E−04 | 4.44E−07 | −5.18E−08 |

TABLE 23

| Surface # | Surface Type | Comments | | Radius | T | Nd | Vd | D/2 |
|---|---|---|---|---|---|---|---|---|
| 1 | Stop | stop | | Infinity | −1.179 | | | 2.780 |
| 2 | QED_TYPE_1 | $L_1$ | $S_1$ | 3.758 | 2.129 | 1.589 | 61.248 | 2.780 |
| 3 | QED_TYPE_1 | | $S_2$ | 16.982 | 1.451 | | | 2.393 |
| 4 | QED_TYPE_1 | $L_2$ | $S_3$ | −4.844 | 0.527 | 1.640 | 23.523 | 1.866 |
| 5 | QED_TYPE_1 | | $S_4$ | 6.532 | 0.152 | | | 1.689 |
| 6 | QED_TYPE_1 | $L_3$ | $S_5$ | 4.374 | 1.014 | 1.535 | 55.664 | 1.693 |
| 7 | QED_TYPE_1 | | $S_6$ | 49.355 | 0.114 | | | 1.658 |
| 8 | QED_TYPE_1 | $L_4$ | $S_7$ | 26.407 | 1.736 | 1.640 | 23.523 | 1.650 |
| 9 | QED_TYPE_1 | | $S_8$ | −4.746 | 0.095 | | | 1.632 |
| 10 | QED_TYPE_1 | $L_5$ | $S_9$ | −4.779 | 0.273 | 1.535 | 55.664 | 1.605 |
| 11 | QED_TYPE_1 | | $S_{10}$ | 14.063 | 5.856 | | | 1.618 |
| 12 | STANDARD | IR Cut-Off | | Infinity | 0.210 | 1.517 | 64.167 | 2.799 |
| 13 | STANDARD | | | Infinity | 0.500 | | | 2.828 |
| 14 | Image | | | Infinity | — | | | 2.933 |

TABLE 24

| # | k | Max Radius | A0 | A1 | A2 | A3 | A4 | A5 |
|---|---|---|---|---|---|---|---|---|
| 4 | −2.296 | 1.858 | 9.41E−02 | −1.97E−03 | 1.50E−05 | 2.73E−05 | −1.10E−05 | 1.47E−06 |
| 5 | 9.483 | 1.661 | −9.79E−03 | 3.07E−03 | 1.90E−05 | 4.84E−05 | 6.79E−06 | −8.67E−07 |
| 6 | −2.619 | 1.663 | −2.79E−02 | −1.64E−03 | −1.57E−05 | −5.52E−07 | 1.50E−05 | −2.00E−06 |
| 7 | 10.398 | 1.630 | 2.56E−04 | −6.63E−03 | −2.34E−05 | −6.37E−05 | −1.93E−10 | 1.09E−10 |
| 8 | −367.355 | 1.630 | −4.47E−02 | −1.13E−04 | 4.08E−04 | −1.35E−05 | −2.75E−06 | 3.61E−07 |
| 9 | −10.130 | 1.667 | −7.09E−02 | −1.51E−03 | 5.65E−07 | −4.95E−05 | 7.37E−06 | −9.61E−07 |
| 10 | −10.587 | 1.647 | −8.62E−02 | −2.59E−03 | 2.61E−05 | −8.81E−05 | 1.06E−05 | −1.40E−06 |
| 11 | −9.745 | 1.659 | −4.10E−02 | 9.88E−04 | 5.35E−05 | 4.08E−05 | 4.44E−07 | −5.18E−08 |

EXAMPLE 9

TABLE 25

| | |
|---|---|
| EFL | 11.190 |
| TTL | 11.135 |
| F/# | 2.590 |
| SDL/2 | 2.620 |
| BFL | 4.303 |
| TTL/EFL | 0.995 |

TABLE 25-continued

| | |
|---|---|
| BFL/TTL | 0.386 |
| CA($S_1$)/CA($S_3$) | 1.195 |
| T(AS to $S_3$)/TTL | 0.191 |
| SDL/CA($S_{2N}$) | 1.638 |
| $f_1$ | 4.559 |
| $f_2$ | −3.894 |
| $f_3$ | 7.111 |
| $f_4$ | −8.492 |

TABLE 26

| # | | | | R | T | Nd | Vd | CA/2 | k |
|---|---|---|---|---|---|---|---|---|---|
| 1 | Evn-asph | $L_1$ | $S_1$ | 3.252 | 2.571 | 1.534 | 55.663 | 2.16 | −0.763 |
| 2 | Evn-asph | | $S_2$ | −7.055 | 0.253 | | | 1.76 | −17.097 |
| 3 | Evn-asph | $L_2$ | $S_3$ | −10.672 | 0.444 | 1.6397 | 23.5288 | 1.60 | −75.529 |
| 4 | Evn-asph | | $S_4$ | 3.302 | 0.309 | | | 1.45 | −0.248 |
| 5 | Evn-asph | $L_3$ | $S_5$ | 10.322 | 2.569 | 1.6397 | 23.5288 | 1.47 | 15.386 |
| 6 | Evn-asph | | $S_6$ | −7.343 | 0.403 | | | 1.46 | −43.555 |
| 7 | Evn-asph | $L_4$ | $S_7$ | −4.066 | 0.282 | 1.534 | 55.663 | 1.45 | −22.400 |
| 8 | Evn-asph | | $S_8$ | −39.758 | 3.804 | | | 1.60 | −20.554 |
| 9 | Flat | | | Infinity | 0.210 | 1.5168 | 64.16733 | 2.524 | |
| 10 | Flat | | | Infinity | 0.290 | | | 2.555 | |
| 11 | Flat | | | Infinity | 0.000 | | | 2.626 | |

TABLE 27

| # | A1 | A2 | A3 | A4 | A5 | A6 | A7 |
|---|---|---|---|---|---|---|---|
| 1 | 1.6499E−03 | −1.0742E−04 | 5.7901E−06 | −8.6098E−08 | −1.7012E−06 | 1.8672E−07 | −2.7417E−08 |
| 2 | 3.0173E−03 | −1.4633E−03 | 7.0329E−05 | −1.5844E−05 | −3.5031E−06 | 8.0518E−07 | 0.0000E+00 |
| 3 | −6.8586E−03 | 5.5011E−03 | −1.6856E−03 | 2.1537E−04 | 1.2470E−05 | −1.0238E−05 | 9.8851E−07 |
| 4 | −8.1487E−03 | 5.6510E−03 | −7.1159E−04 | 1.4107E−05 | 3.5178E−04 | 1.6510E−05 | 0.0000E+00 |
| 5 | −4.9793E−04 | −4.5018E−03 | −2.6820E−04 | 3.0430E−04 | 2.0799E−04 | 1.9782E−05 | 0.0000E+00 |
| 6 | −2.4020E−03 | 1.2967E−03 | −2.1528E−04 | −1.8139E−04 | −2.3192E−05 | 6.9007E−05 | 0.0000E+00 |

TABLE 27-continued

| # | A1 | A2 | A3 | A4 | A5 | A6 | A7 |
|---|---|---|---|---|---|---|---|
| 7 | −6.5893E−02 | 1.4911E−02 | −4.1874E−03 | 8.7863E−05 | 3.9488E−05 | 7.0827E−05 | 0.0000E+00 |
| 8 | −3.4127E−02 | 2.0251E−03 | 1.8783E−03 | −1.2365E−03 | 2.2451E−04 | 3.2977E−05 | −1.1683E−05 |

EXAMPLE 10

TABLE 28

| EFL | 7.970 |
|---|---|
| TTL | 7.780 |
| F/# | 2.148 |
| SDL/2 | 2.930 |
| BFL | 3.266 |
| TTL/EFL | 0.976 |
| BFL/TTL | 0.420 |

TABLE 28-continued

| $CA(S_1)/CA(S_3)$ | 1.076 |
|---|---|
| $T(AS \text{ to } S_3)/TTL$ | 0.039 |
| $SDL/CA(S_{2N})$ | 1.580 |
| $f_1$ | 3.986 |
| $f_2$ | −5.312 |
| $f_3$ | −760.018 |
| $f_4$ | 32.416 |
| $f_5$ | −70.342 |

TABLE 29

| # | Type | Comments | | R | T | Nd | Vd | CA/2 | k |
|---|---|---|---|---|---|---|---|---|---|
| 1 | Evn-asph | $L_1$ | $S_1$ | 2.271 | 1.127 | 1.67 | 54.96 | 1.8 | 7.979E−07 |
| 2 | Evn-asph | | $S_2$ | 11.822 | 0.06 | | | 1.725 | 2.410 |
| 3 | Evn-asph | $L_2$ | $S_3$ | 14.756 | 0.27 | 1.64 | 23.52 | 1.7 | 13.805 |
| 4 | Evn-asph | | $S_4$ | 2.728 | 0.974 | | | 1.45 | 2.902E−03 |
| 5 | Evn-asph | $L_3$ | $S_5$ | 3.713 | 0.416 | 1.64 | 23.52 | 1.55 | −2.868 |
| 6 | Evn-asph | | $S_6$ | 3.524 | 0.764 | | | 1.5 | −8.486 |
| 7 | Evn-asph | $L_4$ | $S_7$ | −5.301 | 0.338 | 1.64 | 23.52 | 1.48 | 2.743 |
| 8 | Evn-asph | | $S_8$ | −4.321 | 0.212 | | | 1.6 | 2.578 |
| 9 | Evn-asph | $L_5$ | $S_9$ | 4.327 | 0.352 | 1.53 | 55.66 | 1.68 | −9.755 |
| 10 | Evn-asph | | $S_{10}$ | 3.771 | 2.656 | | | 1.8 | −6.534 |
| 11 | Flat | | | Infinity | 0.210 | 1.52 | 64.16 | 2.894 | |
| 12 | Flat | | | Infinity | 0.401 | | | 2.938 | |
| 13 | Flat | | | Infinity | — | | | 3.028 | |

TABLE 30

| # | A1 | A2 | A3 | A4 | A5 | A6 | A7 |
|---|---|---|---|---|---|---|---|
| 1 | 4.421E−05 | −2.009E−04 | −1.152E−04 | −6.051E−10 | | | |
| 2 | 6.027E−03 | −1.244E−03 | −5.380E−08 | | | | |
| 3 | 0.020 | 7.012E−04 | −1.081E−03 | −6.297E−08 | | | |
| 4 | 0.024 | 0.011 | 4.241E−04 | −9.114E−08 | | | |
| 5 | −0.022 | 8.939E−03 | 2.200E−03 | −1.002E−06 | | | |
| 6 | −0.012 | 6.756E−03 | −2.299E−03 | 1.314E−03 | 1.758E−04 | −1.030E−05 | |
| 7 | −0.017 | 0.053 | −0.044 | 7.968E−03 | −1.599E−03 | 6.117E−04 | 7.436E−09 |
| 8 | −0.086 | 0.159 | −0.117 | 0.041 | −9.090E−03 | 1.280E−03 | 2.793E−07 |
| 9 | −0.252 | 0.182 | −0.084 | 0.016 | −6.759E−04 | −1.940E−06 | |
| 10 | −0.175 | 0.095 | −0.040 | 8.597E−03 | −7.751E−04 | −8.160E−07 | |

Sign of refractive elements:

TABLE 31

| | Ex1 | Ex2 | Ex3 | Ex4 | Ex5 | Ex6 | Ex7 | Ex8 | Ex9 | Ex10 |
|---|---|---|---|---|---|---|---|---|---|---|
| $f_1$ | + | + | + | + | + | + | + | + | + | + |
| $f_2$ | − | − | − | − | − | − | − | − | − | − |
| $f_3$ | + | + | + | + | + | + | + | + | + | − |
| $f_4$ | − | + | − | − | + | + | − | + | − | + |
| f5 | X | − | − | − | − | + | − | X | − |

TABLE 32

| | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| F# | 2.735 | 2.727 | 2.819 | 2.704 | 2.671 | 2.727 | 2.612 | 2.690 | 2.590 | 2.148 |
| EFL [mm] | 13.809 | 15.001 | 10.911 | 12.166 | 12.020 | 15.000 | 16.142 | 14.955 | 11.190 | 7.970 |
| TTL [mm] | 13.612 | 14.472 | 10.585 | 11.856 | 11.216 | 14.507 | 14.963 | 14.056 | 11.135 | 7.780 |
| BFL [mm] | 4.932 | 7.617 | 5.000 | 6.382 | 6.412 | 6.750 | 7.459 | 6.566 | 4.303 | 3.266 |
| TTL/EFL | 0.986 | 0.965 | 0.970 | 0.975 | 0.933 | 0.967 | 0.927 | 0.940 | 0.995 | 0.976 |
| BFL/TTL | 0.362 | 0.526 | 0.472 | 0.538 | 0.572 | 0.465 | 0.498 | 0.467 | 0.386 | 0.420 |
| SDL [mm] | 5.860 | 5.860 | 5.240 | 5.240 | 5.240 | 5.860 | 5.860 | 5.860 | 5.240 | 5.860 |
| $CA(S_1)/CA(S_3)$ | 1.310 | 1.408 | 1.212 | 1.277 | 1.388 | 1.361 | 1.489 | 1.489 | 1.195 | 1.076 |
| T(AS to $S_3$)/TTL | 0.204 | 0.157 | 0.113 | 0.129 | 0.138 | 0.103 | 0.160 | 0.171 | 0.191 | 0.039 |
| SDL/CA($S_{2N}$) | 1.503 | 1.577 | 1.678 | 1.685 | 1.692 | 1.581 | 1.635 | 1.811 | 1.638 | 1.580 |
| $f_1$ [mm] 0.587 μm | 5.594 | 6.359 | 4.519 | 5.426 | 4.681 | 6.186 | 8.251 | 7.731 | 4.559 | 3.986 |
| $f_2$ [mm] 0.587 μm | −4.823 | −4.495 | −3.153 | −2.822 | −4.152 | −4.313 | −3.476 | −4.271 | −3.894 | −5.312 |
| $f_3$ [mm] 0.587 μm | 9.088 | 48.439 | 3.343 | 3.047 | 34.206 | 4.578 | 5.637 | 8.905 | 7.111 | −760.018 |
| $f_4$ [mm] 0.587 μm | −10.440 | 9.909 | −5.268 | −7.208 | 11.682 | −7.114 | −5.582 | 6.428 | −8.492 | 32.416 |
| $f_5$ [mm] 0.587 μm | — | −20.537 | −35.623 | −27.026 | −12.516 | −48.010 | 5.558 | −6.636 | — | −70.342 |
| $f_1$/EFL | 0.405 | 0.423 | 0.414 | 0.445 | 0.389 | 0.412 | 0.511 | 0.517 | 0.407 | 0.500 |
| $|f_2/f_1|$ | 0.862 | 0.706 | 0.697 | 0.520 | 0.886 | 0.697 | 0.421 | 0.552 | 0.854 | 1.332 |
| TTL/Min_$Gap_1$ | 61.315 | 28.657 | 62.633 | 118.560 | 320.457 | 70.422 | 20.753 | 23.905 | 70.924 | 222.286 |
| TTL/Min_$Gap_2$ | 56.717 | 482.400 | 23.627 | 77.490 | 303.135 | 25.722 | 146.696 | 156.178 | 218.333 | 17.642 |
| TTL/Min_$Gap_3$ | 112.496 | 120.600 | 126.012 | 263.467 | 303.135 | 146.535 | 415.639 | 265.208 | 140.949 | 176.818 |
| TTL/Min_$Gap_4$ | — | 336.558 | 286.081 | 370.500 | 320.457 | 84.343 | 467.594 | 281.120 | — | 58.939 |
| TTL/OA_$Gap_1$ | 31.878 | 15.168 | 27.422 | 29.202 | 62.306 | 26.915 | 7.615 | 9.687 | 44.059 | 129.667 |
| TTL/OA_$Gap_2$ | 19.614 | 29.299 | 12.265 | 35.711 | 20.465 | 11.495 | 80.881 | 92.473 | 36.043 | 7.987 |
| TTL/OA_$Gap_3$ | 24.092 | 69.772 | 86.762 | 169.371 | 193.362 | 77.578 | 46.906 | 123.298 | 27.608 | 10.188 |
| TTL/OA_$Gap_4$ | — | 55.151 | 23.264 | 99.630 | 215.673 | 19.873 | 272.055 | 147.958 | — | 36.641 |
| $STD_1$ | 0.009 | 0.001 | 0.020 | 0.039 | 0.021 | 0.018 | 0.067 | 0.059 | 0.011 | 0.012 |
| $STD_2$ | 0.043 | 0.077 | 0.042 | 0.017 | 0.105 | 0.036 | 0.027 | 0.007 | 0.047 | 0.065 |
| $STD_3$ | 0.054 | 0.027 | 0.044 | 0.019 | 0.018 | 0.040 | 0.044 | 0.005 | 0.055 | 0.122 |
| $STD_4$ | — | 0.032 | 0.080 | 0.017 | 0.001 | 0.069 | 0.020 | 0.002 | — | 0.021 |

The following list and Table 33 summarize the design characteristics and parameters as they appear in the examples listed above. These characteristics helps to achieve the goal of a compact folded lens with large lens assembly aperture:

"AA": $AA_1 \equiv BFL/TTL > 0.35$, $AA_2 \equiv BFL/TTL > 0.4$, $AA_3 \equiv BFL/TTL > 0.5$;

"BB": $BB_1 \equiv CA(S_1)/CA(S_3) > 1.2$, $BB_2 \equiv CA(S_1)/CA(S_3) > 1.3$, $BB_3 \equiv CA(S_1)/CA(S_3) > 1.4$;

"CC": $CC_1 \equiv T(AS\ to\ S_3)/TTL > 0.1$, $CC_2 \equiv T(AS\ to\ S_3)/TTL > 0.135$, $CC_3 \equiv T(AS\ to\ S_3)/TTL > 0.15$;

"DD": At least two gaps that comply with $DD_1 \equiv STD < 0.020$, $DD_2 \equiv STD < 0.015$, $DD_3 \equiv STD < 0.010$;

"EE": At least 3 gaps that comply with $EE_1 \equiv STD < 0.035$, $EE_2 \equiv STD < 0.025$, $EE_3 \equiv STD < 0.015$;

"FF": At least 4 gaps that comply with $FF_1 \equiv STD < 0.050$, $FF_2 \equiv STD < 0.035$, $FF_3 \equiv STD < 0.025$;

"GG": $GG_1 \equiv SDL/CA(S_{2N}) > 1.5$, $GG_2 \equiv SDL/CA(S_{2N}) > 1.55$, $GG_3 \equiv SDL/CA(S_{2N}) > 1.6$;

"HH": a power sign sequence;

"II": At least 1 gap that complies with $II_1 \equiv STD < 0.01$ and OA_Gap/TTL < 1/80, $II_2 \equiv STD < 0.015$ and OA_Gap/TTL < 1/65;

"JJ": $JJ_1$: Abbe number sequence of lens elements $L_1$, $L_2$ and $L_3$ can be respectively larger than 50, smaller than 30 and larger than 50;

$JJ_2$: Abbe number sequence of lens elements $L_1$, $L_2$ and $L_3$ can be respectively larger than 50, smaller than 30 and smaller than 30;

"KK": $KK_1 \equiv |f_2/f_1| > 0.4$ and Abbe number sequence of lens elements $L_1$, $L_2$ and $L_3$ can be respectively larger than 50, smaller than 30 and smaller than 30; $KK_2 \equiv |f_2/f_1| < 0.5$ and Abbe number sequence of lens elements $L_1$, $L_2$ and $L_3$ can be respectively larger than 50, smaller than 30 and larger than 50; and "LL": $LL_1 \equiv f_1/EFL < 0.55$, $LL_2 \equiv f_1/EFL < 0.45$;

"MM": $MM_1 \equiv |f_2/f_1| < 0.9$, $MM_2 |f_2/f_1| < 0.5$; and

"NN": $NN_1 \equiv TTL/EFL < 0.99$, $NN_2 \equiv TTL/EFL < 0.97$, $NN_3 \equiv TTL/EFL < 0.95$.

"OO": At least two gaps that comply with $OO_1 \equiv STD > 0.020$, $OO_2 \equiv STD > 0.03$, $OO_3 \equiv STD > 0.040$;

"PP": At least 3 gaps that comply with $PP_1 \equiv STD > 0.015$, $PP_2 \equiv STD > 0.02$, $PP_3 STD > 0.03$;

"QQ": At least 4 gaps that comply with $QQ_1 \equiv STD > 0.015$, $QQ_2 \equiv STD > 0.02$, $QQ_3 \equiv STD > 0.03$;

"RR": At least 3 OA_Gaps that comply with $RR_1 \equiv TTL/Min\_Gap > 50$, $RR_2 \equiv TTL/Min\_Gap > 60$, $RR_3 \equiv TTL/Min\_Gap > 100$.

TABLE 33

| | EX1 | EX2 | EX3 | EX4 | EX5 | EX6 | EX7 | EX8 | EX9 | EX10 |
|---|---|---|---|---|---|---|---|---|---|---|
| $AA_1$ | ✓ | ✓ | ✓ | ✓ | ✓ | ✓ | ✓ | ✓ | ✓ | ✓ |
| $AA_2$ | X | ✓ | ✓ | ✓ | ✓ | ✓ | ✓ | ✓ | X | ✓ |
| $AA_3$ | X | ✓ | X | ✓ | ✓ | X | X | X | X | X |
| $BB_1$ | ✓ | ✓ | ✓ | ✓ | ✓ | ✓ | ✓ | ✓ | X | X |
| $BB_2$ | ✓ | ✓ | X | X | ✓ | ✓ | ✓ | ✓ | X | X |
| $BB_3$ | X | ✓ | X | X | X | X | ✓ | ✓ | X | X |
| $CC_1$ | ✓ | ✓ | ✓ | ✓ | ✓ | ✓ | ✓ | ✓ | ✓ | X |
| $CC_2$ | ✓ | ✓ | X | X | ✓ | X | ✓ | ✓ | ✓ | X |
| $CC_3$ | ✓ | ✓ | X | X | X | X | ✓ | ✓ | ✓ | X |
| $DD_1$ | X | X | X | ✓ | ✓ | X | X | ✓ | X | X |

TABLE 33-continued

| | EX1 | EX2 | EX3 | EX4 | EX5 | EX6 | EX7 | EX8 | EX9 | EX10 |
|---|---|---|---|---|---|---|---|---|---|---|
| $DD_2$ | X | X | X | X | X | X | X | ✓ | X | X |
| $DD_3$ | X | X | X | X | X | X | X | ✓ | X | X |
| $EE_1$ | X | ✓ | X | ✓ | ✓ | X | X | ✓ | X | X |
| $EE_2$ | X | X | X | ✓ | ✓ | X | X | ✓ | X | X |
| $EE_3$ | X | X | X | X | X | X | X | ✓ | X | X |
| $FF_1$ | X | X | X | X | X | X | X | X | X | X |
| $FF_2$ | X | X | X | X | X | X | X | X | X | X |
| $FF_3$ | X | X | X | X | X | X | X | X | X | X |
| $GG_1$ | ✓ | ✓ | ✓ | ✓ | ✓ | ✓ | ✓ | ✓ | ✓ | ✓ |
| $GG_2$ | X | ✓ | ✓ | ✓ | ✓ | ✓ | ✓ | ✓ | ✓ | ✓ |
| $GG_3$ | X | X | ✓ | ✓ | ✓ | X | ✓ | ✓ | ✓ | X |
| HH | PNPN | PNPPN | PNPNN | PNPNN | PNPPN | PNPNN | PNPNP | PNPPN | PNPN | PNNPN |
| $II_1$ | X | X | X | X | ✓ | X | X | ✓ | X | X |
| $II_2$ | X | X | X | X | ✓ | X | X | ✓ | X | ✓ |
| $JJ_1$ | X | X | X | X | X | X | ✓ | ✓ | X | X |
| $JJ_2$ | ✓ | ✓ | ✓ | ✓ | ✓ | ✓ | X | X | ✓ | ✓ |
| $KK_1$ | ✓ | ✓ | ✓ | ✓ | X | ✓ | X | X | ✓ | ✓ |
| $KK_2$ | X | X | X | X | X | X | ✓ | ✓ | X | X |
| $LL_1$ | ✓ | ✓ | ✓ | ✓ | ✓ | ✓ | ✓ | ✓ | ✓ | ✓ |
| $LL_2$ | ✓ | ✓ | ✓ | ✓ | ✓ | ✓ | X | X | ✓ | X |
| $MM_1$ | ✓ | ✓ | ✓ | ✓ | ✓ | ✓ | ✓ | ✓ | ✓ | X |
| $MM_2$ | X | X | X | ✓ | X | X | ✓ | X | X | X |
| $NN_1$ | ✓ | ✓ | ✓ | ✓ | ✓ | ✓ | ✓ | ✓ | ✓ | ✓ |
| $NN_2$ | X | ✓ | X | X | ✓ | ✓ | ✓ | ✓ | X | X |
| $NN_3$ | X | X | X | X | ✓ | X | ✓ | ✓ | X | X |
| $OO_1$ | ✓ | ✓ | ✓ | X | ✓ | ✓ | ✓ | X | ✓ | ✓ |
| $OO_2$ | ✓ | ✓ | ✓ | X | X | ✓ | ✓ | X | ✓ | ✓ |
| $OO_3$ | ✓ | X | ✓ | X | X | ✓ | ✓ | X | ✓ | ✓ |
| $PP_1$ | X | ✓ | ✓ | ✓ | ✓ | ✓ | ✓ | X | X | ✓ |
| $PP_2$ | X | ✓ | ✓ | X | X | ✓ | ✓ | X | X | ✓ |
| $PP_3$ | X | ✓ | ✓ | X | X | ✓ | X | X | X | X |
| $QQ_1$ | X | ✓ | ✓ | ✓ | ✓ | ✓ | ✓ | X | X | X |
| $QQ_2$ | X | X | ✓ | X | X | X | ✓ | X | X | X |
| $QQ_3$ | X | X | ✓ | X | X | X | X | X | X | X |
| $RR_1$ | ✓ | ✓ | ✓ | ✓ | ✓ | ✓ | ✓ | ✓ | ✓ | ✓ |
| $RR_2$ | X | ✓ | ✓ | ✓ | ✓ | X | ✓ | ✓ | ✓ | X |
| $RR_3$ | X | ✓ | ✓ | ✓ | ✓ | X | ✓ | ✓ | X | X |

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A folded lens assembly for a folded camera, consisting of: N=5 lens elements that include, in order for an object side to an image side, a first lens element $L_1$ with a first lens element surface clear aperture $CA(S_1)$, a second lens element $L_2$ with a second lens element surface clear aperture $CA(S_3)$, and a fifth lens element with negative refractive power, wherein $CA(S_1)/CA(S_3)>1.2$, and wherein the lens assembly has a ratio between an image sensor diagonal length SDL and a clear aperture of a last lens element surface $CA(S_{2N})$, $SDL/CA(S_{2N})>1.5$, wherein the first lens element has positive refractive power and the second lens element has negative refractive power, and wherein the N lens elements further include a third lens element with positive refractive power and a fourth lens element with negative refractive power.

2. A folded lens assembly for a folded camera, consisting of: N=5 lens elements that include, in order for an object side to an image side, a first lens element $L_1$ with a first lens element surface clear aperture $CA(S_1)$, a second lens element $L_2$ with a second lens element surface clear aperture $CA(S_3)$, and a fifth lens element with negative refractive power, wherein $CA(S_1)/CA(S_3)>1.2$, and wherein the lens assembly has a ratio between an image sensor diagonal length SDL and a clear aperture of a last lens element surface $CA(S_{2N})$, $SDL/CA(S_{2N})>1.5$, wherein the lens assembly has a total track length (TTL) and a back focal length (BFL) and wherein a ratio BFL/TTL>0.35, wherein the TTL is a distance from the first surface $S_1$ of the first lens element to an image sensor, and wherein the BFL is a distance from a last surface of a last lens element $S_{2N}$ to the image sensor.

3. The folded lens assembly of claim 2, wherein an optical window is positioned in a path defining the BFL and the TTL.

* * * * *